US012546992B2

United States Patent
Greif et al.

(10) Patent No.: US 12,546,992 B2
(45) Date of Patent: Feb. 10, 2026

(54) STATIC UNIFORMITY CORRECTION FOR A SCANNING PROJECTOR PERFORMING CONSECUTIVE NON-LINEAR SCAN WITH MULTI-RIDGE LIGHT SOURCES

(71) Applicant: Meta Platforms Technologies, LLC, Menlo Park, CA (US)

(72) Inventors: Daniel Guenther Greif, Kirkland, WA (US); Brian Wheelwright, Sammamish, WA (US); Zachary Kehs, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 414 days.

(21) Appl. No.: 18/130,550

(22) Filed: Apr. 4, 2023

(65) Prior Publication Data

US 2024/0337832 A1 Oct. 10, 2024

(51) Int. Cl.
*G02B 26/08* (2006.01)
*G02B 26/10* (2006.01)
*G02B 27/00* (2006.01)

(52) U.S. Cl.
CPC ......... *G02B 27/0031* (2013.01); *G02B 26/10* (2013.01)

(58) Field of Classification Search
CPC ................ G02B 27/0031; G02B 26/10; G02B 2027/0112; G02B 2027/0118; G02B 2027/0178; G02B 26/101; G02B 27/0172
See application file for complete search history.

(56) References Cited

U.S. PATENT DOCUMENTS

2024/0027748 A1\* 1/2024 Greif .................... G02B 26/101

\* cited by examiner

*Primary Examiner* — Euncha P Cherry
(74) *Attorney, Agent, or Firm* — Greenberg Traurig, LLP

(57) ABSTRACT

Static non-uniformity effects in a coherent biresonant scanning projector are mitigated through correction factors for pulse events during one frame time. According to an analytical approach, a set of input parameters such as scan angle, micro-electromechanical system (MEMS) obliquity, ridge spacing, etc. are used to optimize color-wise luminance uniformity. According to an optimization approach, pulse correction factors are determined using a custom-defined cost function that attempts to optimize for both luminance and color uniformity.

20 Claims, 24 Drawing Sheets

500

502

504

STATIC UNIFORMITY CORRECTION FOR A SCANNING PROJECTOR PERFORMING CONSECUTIVE NON-LINEAR SCAN WITH MULTI-RIDGE LIGHT SOURCES

TECHNICAL FIELD

This patent application relates generally to a display device, and in particular, to static uniformity correction in at least one scanning projector with multi-ridge light sources using consecutive non-linear (e.g., coherent Lissajous) painting.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted display (HMD) device, such as a wearable eyewear, a wearable headset, or eyeglasses. In some examples, the head-mounted display (HMD) device may project or direct light to may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment. Head-mounted display (HMD) devices require compact and efficient components and modules such as light sources, image projectors, beam scanners, etc., that would have low image artifacts.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
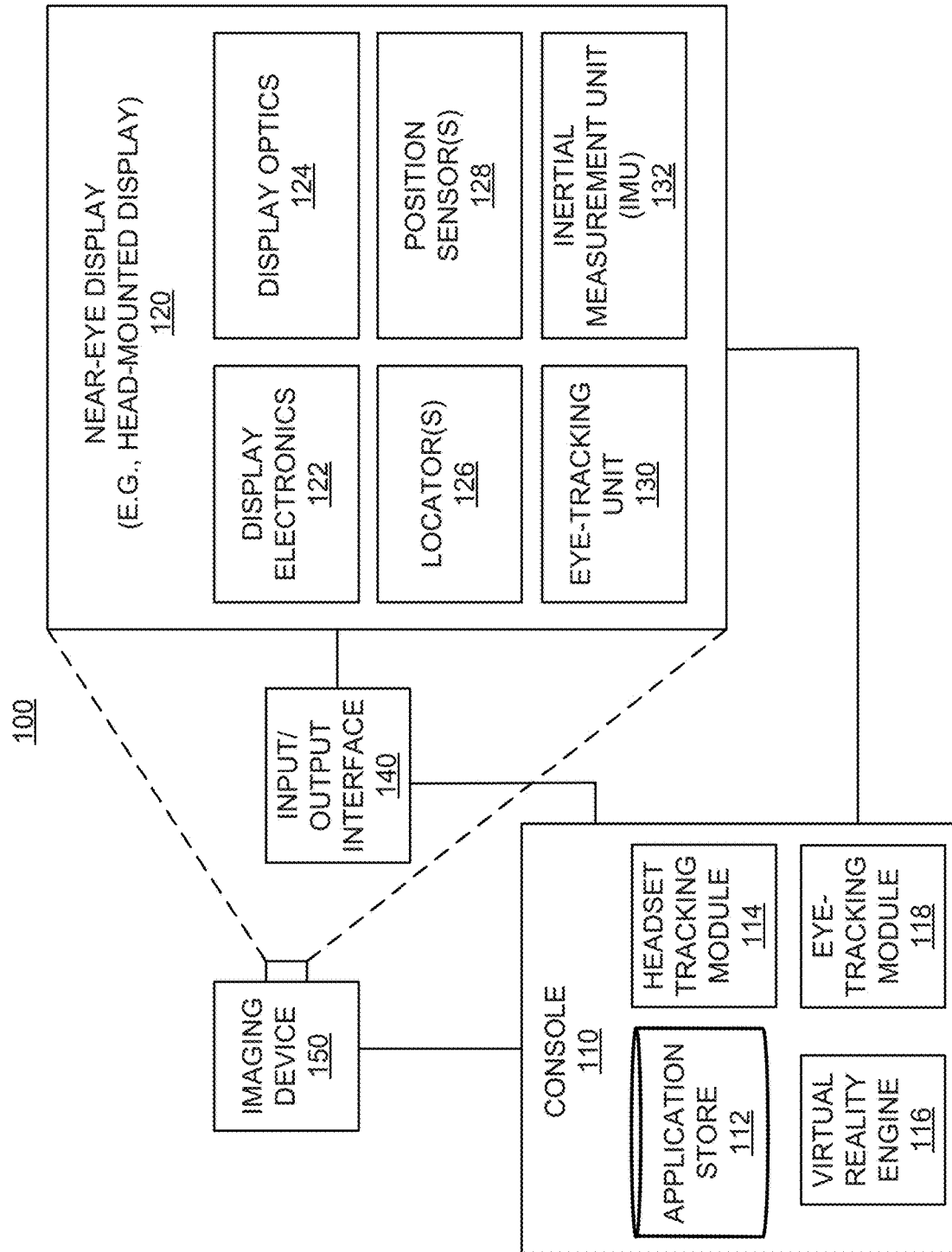
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Virtual reality (VR) and augmented reality (AR) displays may offer a significantly wider field of view (FOV) than traditional displays, creating an immersive experience for a user. A projector display may be used with an X- and Y-tiltable reflector, or a pair of unidirectionally tiltable reflectors, to scan an image-forming light beam across the display's field of view (FOV). Operating the tiltable reflector(s) near mechanical oscillation resonance(s) provides fast scanning rates with less energy consumption in comparison with raster-type scanning. Since a fast scanner consumes a considerable amount of energy, the biresonant scanning may be preferred as it allows considerable power savings.

Resonant scanning, however, may result in nonlinear scanning trajectories due to nearly-sinusoidal X- and Y-tilt angle variation of the tiltable reflector. These nonlinear trajectories may be approximated by a Lissajous pattern, which is a pattern produced by the intersection of two sinusoidal curves with axes at right angles or close to right angles to each other. A Lissajous pattern is an example of complex harmonic motion curves. While an entire image may be obtained by letting the Lissajous pattern to eventually cover the entire field of view of the display, artifacts may appear when a displayed image and/or the viewer's eyes are moving. The Lissajous biresonant scanning may cause splitting, shearing, banding, deformation, and even a complete breakdown of moving objects in the image beyond any recognition of the moving objects. Furthermore, the perceived imagery may be distorted, deformed, and/or appear structured even when the imagery remains still, and it is the viewer's eyes that are moving across the displayed imagery, following a displayed moving object, or performing a saccade-type movement, which may be distracting and unpleasant to the viewer.

In some examples of the present disclosure, a projector of a near-eye display may form an image in angular domain on an eye box for direct observation by a viewer's eye. The projector may employ a controllable light source (e.g., a laser source) and a micro-electromechanical system (MEMS) beam scanner to create a light field from, for example, a collimated light beam. The micro-electromechanical system (MEMS) beam scanner may paint the image on the eye box following a biresonant coherent Lissajous pattern. Emitters of a multi-ridge light source may be aligned horizontally, vertically, or at an arbitrary angle with more than one pixel ridge separation. As the field of view can have many different aspect ratios, the optimal angles may be in a range from 0 degrees to 180 degrees.

According to examples, correction factors for pulse events during one frame time may be determined in a non-linear scanning projector. According to an analytical approach, a set of input parameters such as scan angle, micro-electromechanical system (MEMS) obliquity, ridge spacing, etc. may be used to optimize color-wise luminance uniformity. While the analytic approach may, in some cases, be limited to no-distortion, straight ridge configurations, it may allow computation without a need for memory space. According to an optimization approach, pulse correction factors may be determined using a custom-defined cost function that attempts to optimize for both luminance and color uniformity. Once computed, the correction factor maps may be stored in memory.

In some examples, combining multi-ridge sources with Lissajous pattern painting may provide enhanced display resolution, refresh rate, and/or field of view (FOV). Whereas, employing a single-ridge source, display resolution, refresh rate, and/or field of view (FOV) may be limited.

While some advantages and benefits of the present disclosure are apparent, other advantages and benefits may include reduction of static non-uniformity effects such as variation of brightness further away from a center of a field of view (FOV) and other image artifacts through the use of correction factor computation.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eye box, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular head-mounted display (HMD)) or both eyes (for binocular head-mounted displays (HMDs)). Also, as used herein, an "eye box" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eye box.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a head-mounted display (HMD), a pair of glasses, or other similar wearable eyewear or device. Examples of the near-eye display 120 are further described below with respect to FIGS. 2 and 3. Additionally, in some examples, the functionality described herein may be used in a head-mounted display (HMD) or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye-tracking unit 130. In some examples, the near-eye display 120 may also include one or more locators 126, one or more position sensors 128, and an inertial measurement unit (IMU) 132. In some examples, the near-eye display 120 may omit any of the eye-tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the near-eye display 120 may include a projector (not shown), which may form an image in angular domain for direct observation by a viewer's eye through a pupil. The projector may employ a controllable light source (e.g., a laser source) and a micro-electromechanical system (MEMS) beam scanner to create a light field from, for example, a collimated light beam. The microelectromechanical system (MEMS) beam scanner may "paint" the image on an eye box following a biresonant coherent Lissajous pattern. Emitters of a multi-ridge light source may be aligned horizontally, vertically, or at an arbitrary angle with more than one pixel ridge separation. Static uniformity errors may be corrected through computation of correction factors for pulse events for each frame by analytical or optimization techniques.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye-tracking unit 130 may include one or more eye-tracking systems. As used herein, "eye tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye-tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye-tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye-tracking module 118. Based on the received information, the virtual reality engine 116 may determine content to provide to the near-eye display 120 for presentation to the user.

In some examples, the eye-tracking module 118 may receive eye-tracking data from the eye-tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye-tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2A:
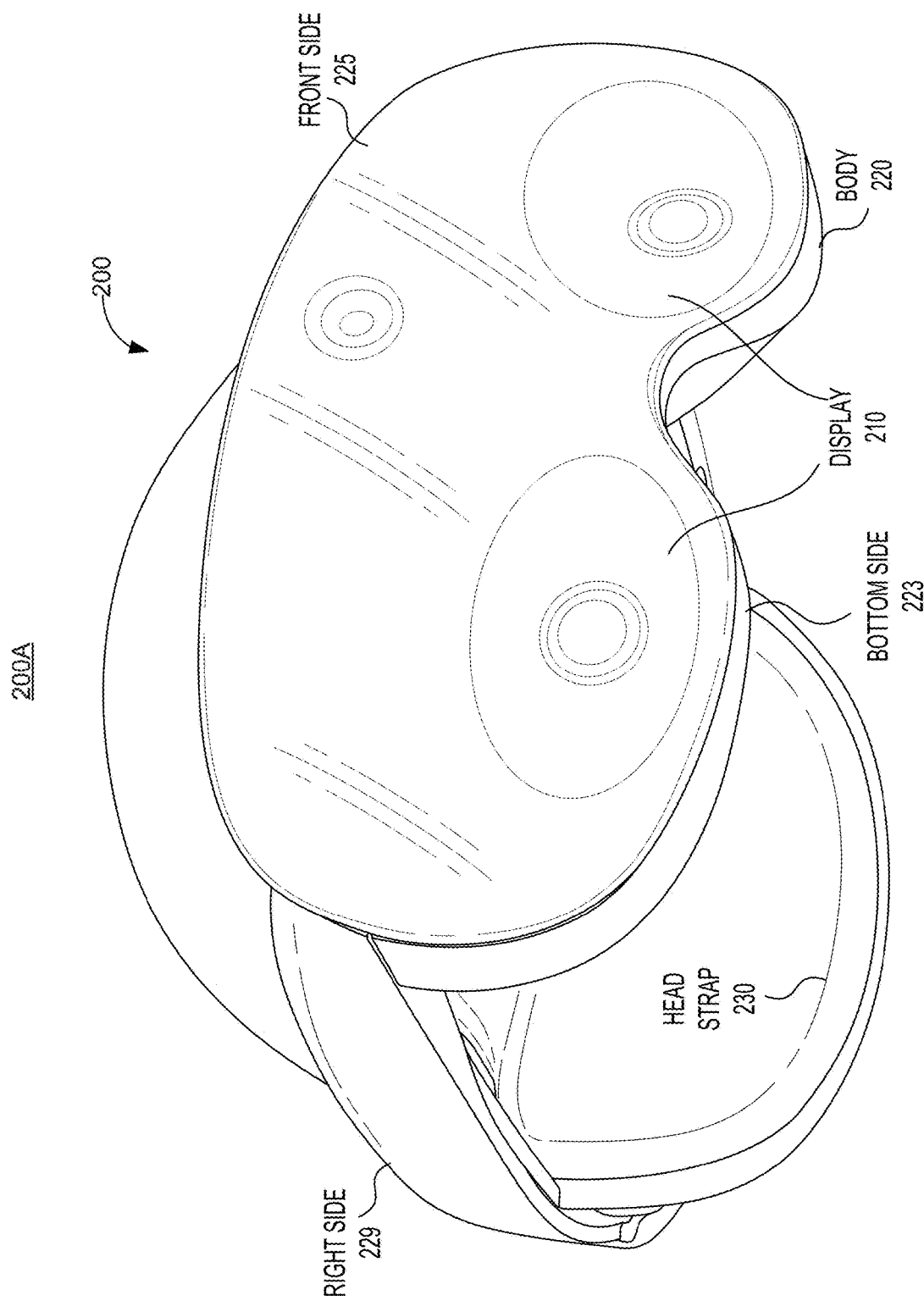
FIGS. 2A-2C illustrate various views of a near-eye display device in the form of a head-mounted display (HMD) device, according to examples.
Figure 2B:
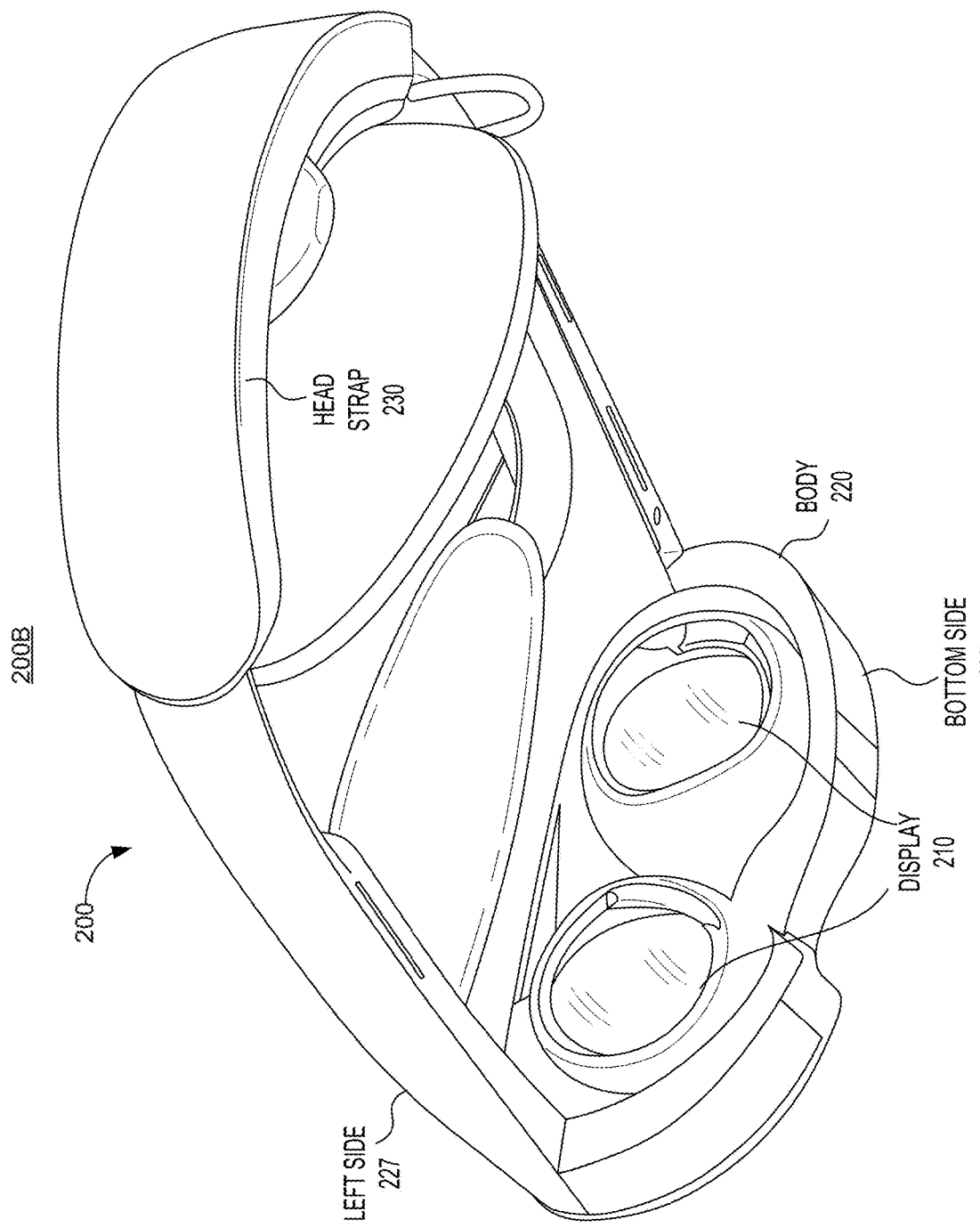
Figure 2C:
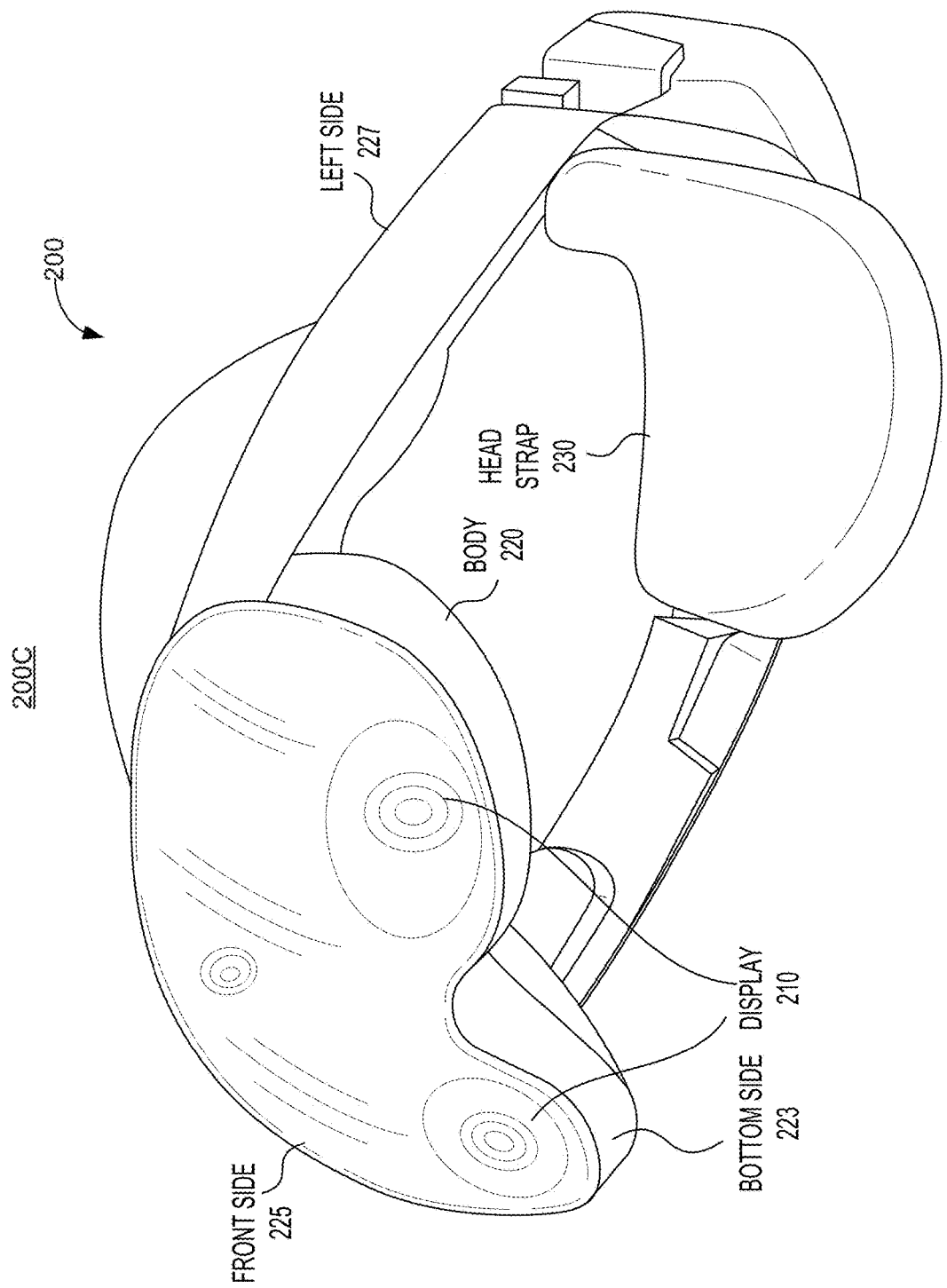

FIGS. 2A-2C illustrate various views of a near-eye display device in the form of a head-mounted display (HMD) device 200, according to examples. In some examples, the head-mounted device (HMD) device 200 may be a part of a virtual reality (VR) system, an augmented reality (AR) system, a mixed reality (MR) system, another system that uses displays or wearables, or any combination thereof. As shown in diagram 200A of FIG. 2A, the head-mounted display (HMD) device 200 may include a body 220 and a head strap 230. The front perspective view of the head-mounted display (HMD) device 200 further shows a bottom side 223, a front side 225, and a right side 229 of the body 220. In some examples, the head strap 230 may have an adjustable or extendible length. In particular, in some examples, there may be a sufficient space between the body 220 and the head strap 230 of the head-mounted display (HMD) device 200 for allowing a user to mount the head-mounted display (HMD) device 200 onto the user's head. For example, the length of the head strap 230 may be adjustable to accommodate a range of user head sizes. In some examples, the head-mounted display (HMD) device 200 may include additional, fewer, and/or different components such as a display 210 to present a wearer augmented reality (AR)/virtual reality (VR) content and a camera to capture images or videos of the wearer's environment.

As shown in the bottom perspective view of diagram 200B of FIG. 2B, the display 210 may include one or more display assemblies and present, to a user (wearer), media or other digital content including virtual and/or augmented views of a physical, real-world environment with computer-generated elements. Examples of the media or digital content presented by the head-mounted display (HMD) device 200 may include images (e.g., two-dimensional (2D) or three-dimensional (3D) images), videos (e.g., 2D or 3D videos), audio, or any combination thereof. In some examples, the user may interact with the presented images or videos through eye tracking sensors enclosed in the body 220 of the head-mounted display (HMD) device 200. The eye tracking sensors may also be used to adjust and improve quality of the presented content.

In some examples, correction factors for pulse events during one frame time may be determined in a non-linear scanning projector. According to an analytical approach, a set of input parameters such as scan angle, micro-electromechanical system (MEMS) obliquity, ridge spacing, etc. may be used to optimize color-wise luminance uniformity. While the analytic approach may, in some cases, be limited to no-distortion, straight ridge configurations, it may allow computation without a need for memory space. According to an optimization approach, pulse correction factors may be determined using a custom-defined cost function that attempts to optimize for both luminance and color uniformity. Once computed, the correction factor maps may be stored in memory of the head-mounted display (HMD) device 200.

In some examples, the head-mounted display (HMD) device 200 may include various sensors (not shown), such as depth sensors, motion sensors, position sensors, and/or eye tracking sensors. Some of these sensors may use any number of structured or unstructured light patterns for sensing purposes. In some examples, the head-mounted display (HMD) device 200 may include an input/output interface for communicating with a console communicatively coupled to the head-mounted display (HMD) device 200 through wired or wireless means. In some examples, the head-mounted display (HMD) device 200 may include a virtual reality engine (not shown) that may execute applications within the head-mounted display (HMD) device 200 and receive depth information, position information, acceleration information, velocity information, predicted future positions, or any combination thereof of the head-mounted display (HMD) device 200 from the various sensors.

In some examples, the information received by the virtual reality engine may be used for producing a signal (e.g., display instructions) to the display 210. In some examples, the head-mounted display (HMD) device 200 may include locators (not shown), which may be located in fixed positions on the body 220 of the head-mounted display (HMD) device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

Figure 3A:
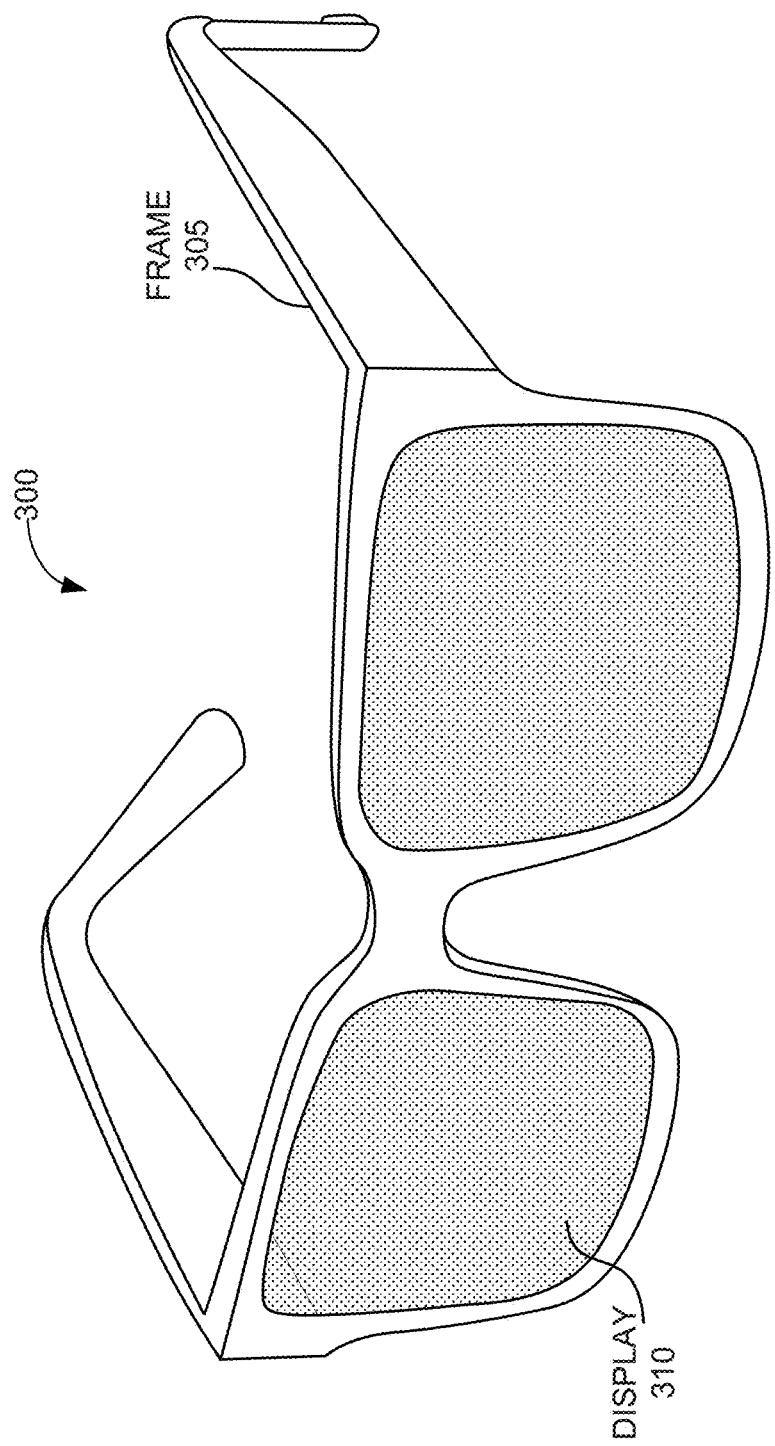
FIGS. 3A and 3B illustrate a perspective view and a top view of a near-eye display in the form of a pair of glasses, according to an example.

FIG. 3A is a perspective view of a near-eye display 300 in the form of a pair of glasses (or other similar eyewear), according to an example. In some examples, the near-eye display 300 may be a specific example of near-eye display 120 of FIG. 1 and may be configured to operate as a virtual reality display, an augmented reality (AR) display, and/or a mixed reality (MR) display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc. In other examples, the display 210 may include a projector, or in place of the display 310 the near-eye display 300 may include a projector. The projector may form an image in angular domain for direct observation by a viewer's eye by painting the image on an eye box following a biresonant coherent Lissajous pattern.

In some examples, the near-eye display 300 may further include various sensors on or within a frame 305. In some examples, the various sensors may include any number of depth sensors, motion sensors, position sensors, inertial sensors, and/or ambient light sensors, as shown. In some examples, the various sensors may include any number of image sensors configured to generate image data representing different fields of views in one or more different directions. In some examples, the various sensors may be used as input devices to control or influence the displayed content of the near-eye display, and/or to provide an interactive virtual reality (VR), augmented reality (AR), and/or mixed reality (MR) experience to a user of the near-eye display 300. In some examples, the various sensors may also be used for stereoscopic imaging or other similar applications.

In some examples, the near-eye display 300 may further include one or more illuminators to project light into a physical environment. The projected light may be associated with different frequency bands (e.g., visible light, infra-red light, ultra-violet light, etc.), and may serve various purposes. In some examples, the one or more illuminator(s) may be used as locators, such as the one or more locators 126 described above with respect to FIGS. 1-2.

In some examples, the near-eye display 300 may also include a camera or other image capture unit. The camera, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications.

Figure 3B:
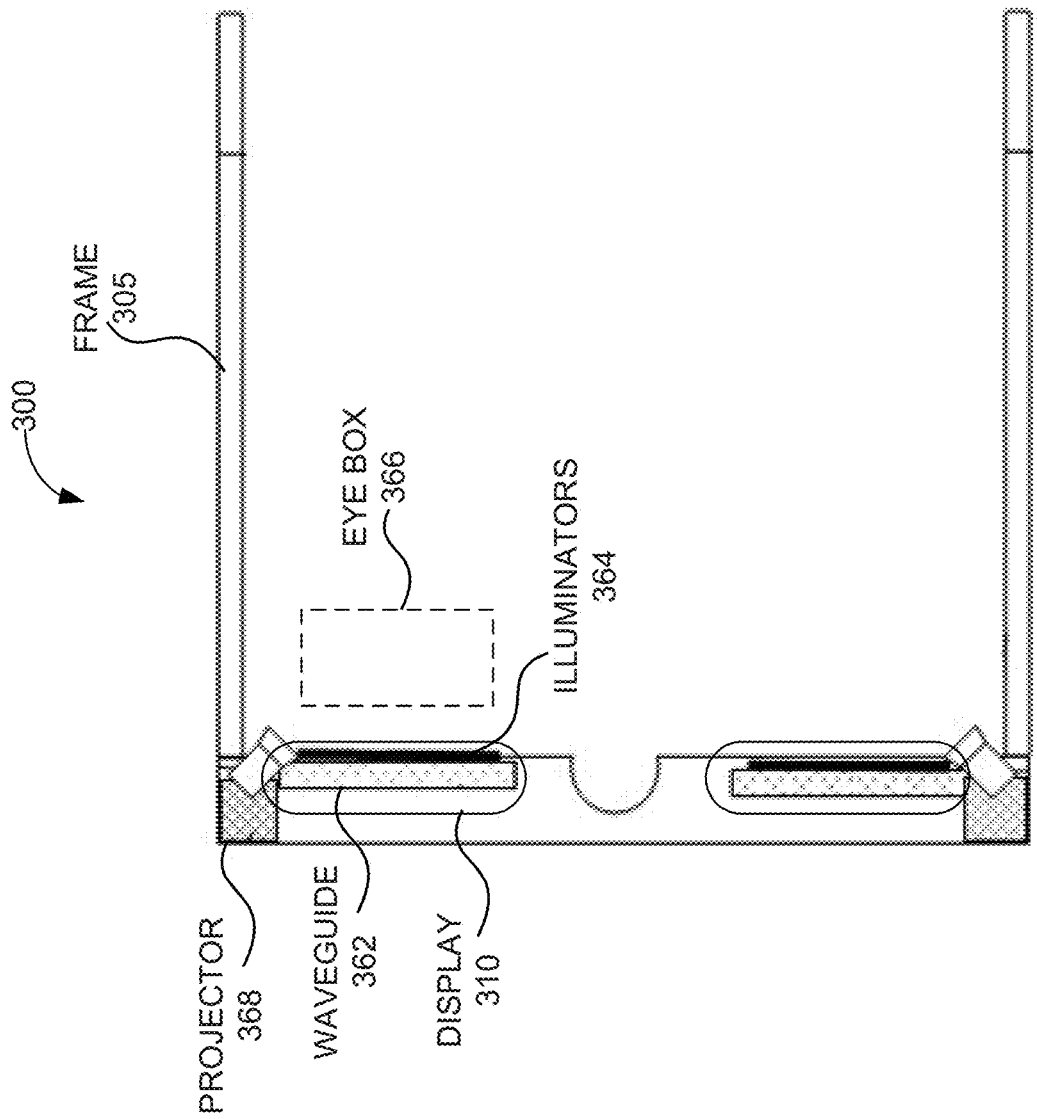

FIG. 3B is a top view of a near-eye display 300 in the form of a pair of glasses (or other similar eyewear), according to an example. In some examples, the near-eye display 300 may include a frame 305 having a form factor of a pair of eyeglasses. The frame 305 supports, for each eye: a scanning projector 368 such as any scanning projector variant considered herein, a pupil-replicating waveguide 362 optically coupled to the projector 368, an eye-tracking camera, and a plurality of illuminators. The illuminators may be supported by the pupil-replicating waveguide 362 for illuminating an eye box 366. The projector 368 may provide a fan of light beams carrying an image in angular domain to be projected into a user's eye. The pupil-replicating waveguide 362 may receive the fan of light beams and provide multiple laterally offset parallel copies of each beam of the fan of light beams, thereby extending the projected image over the eye box 366. The coherence length of the laser sight source of the projector 368 may be less than a difference between optical path lengths of multiple light paths inside the pupil-replicating waveguide 362. This may allow reduction of optical interference at the eye box 366 between portions of the image light propagated via different light paths.

In some examples, multi-emitter laser sources may be used in the projector 368. Each emitter of the multi-emitter laser chip may be configured to emit image light at an emission wavelength of a same color channel. The emission wavelengths of different emitters of the same multi-emitter laser chip may occupy a spectral band having the spectral width of the laser source. The projector 368 may include, for example, two or more multi-emitter laser chips emitting light at wavelengths of a same color channel or different color channels. For augmented reality (AR) applications, the pupil-replicating waveguide 362 may be transparent or translucent to enable the user to view the outside world together with the images projected into each eye and superimposed with the outside world view. The images projected into each eye may include objects disposed with a simulated parallax, so as to appear immersed into the real-world view.

In some examples, instead of directly providing the light from multi-ridge sources (e.g., chips), light may be coupled from different chips or sources into photonic integrated circuit (PIC) waveguides (also referred to as "light channels") or via fibers, thus providing a multi-emitter source with tight ridge spacing. Such light coupling may be used in example implementations as discussed herein.

In some examples, the image processing and eye position/orientation determination functions may be performed by a central controller, not shown, of the near-eye display 300. The central controller may also provide control signals to the projectors 368 to generate the images to be displayed to the user, depending on the determined eye positions, eye orientations, gaze directions, eyes vergence, etc.

Figure 4A:
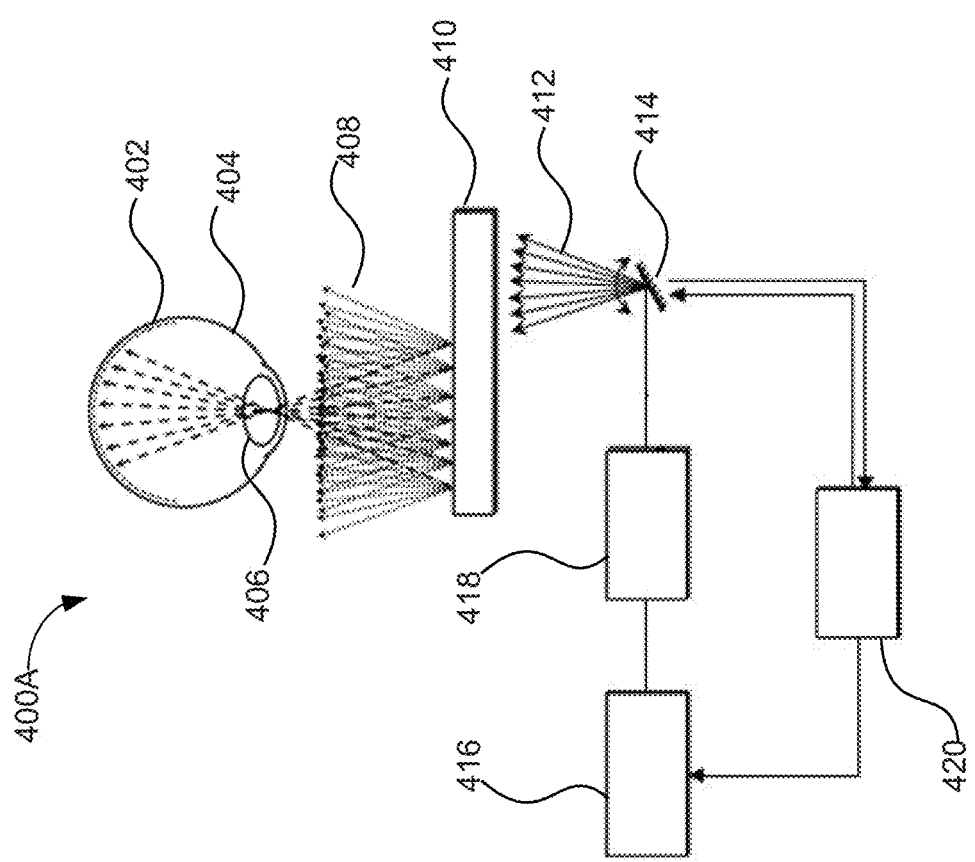
FIG. 4A illustrates a schematic view of a near-eye display based on a scanning image projector, according to an example.

FIG. 4A illustrates a schematic view of a near-eye display based on a scanning image projector, according to an example. FIG. 4A shows a display device 400A including a light source 418, for example, a light-emitting diode or a laser diode, or another suitable semiconductor light source. The light source 418 may provide a light beam. An electronic driver 416 may be coupled to the light source 418 for powering the light source 418, for example, by providing a sequence of powering electric pulses. A beam scanner 414 including a tiltable reflector, for example, a micro-electromechanical system (MEMS) tiltable reflector described further below, may be optically coupled to the light source 418 for scanning the light beam generated by the light source 418. The scanning may be performed in one or two dimensions, for example, about an X-axis and/or Y-axis perpendicular to the X-axis, where X- and Y-axes are in plane of the micro-electromechanical system (MEMS) reflector at its normal (unpowered) position. A pupil replicator 410, for example, a pupil-replicating lightguide, may provide a light field 408 including multiple laterally shifted parallel portions of the scanned light beam 412. The multiple beam portions may have a same beam angle as a direction of propagation of the scanned light beam 412, at every moment of time as the light beam is scanned about one or two axes. While two-dimensional (2D) beam scanners are used as illustrative examples herein, implementations may also employ two one-dimensional (1D) beam scanners.

In some examples, a controller 420 may be coupled to the beam scanner 414 and the electronic driver 416 of the light source 418. The controller 420 may be configured to operate the electronic driver 416 to power the light source 418 in coordination with driving the beam scanner 414. For example, the controller 420 may apply a control signal to cause the beam scanner 414 to scan the light beam through a succession of beam angles or directions, while also applying a power signal to cause the electronic driver 416 to change the brightness of the light source 418 in accordance with an image to be displayed, thus forming an image in angular domain for direct observation by a viewer's eye 404 through a pupil 406. As used herein, the term "image in angular domain" means an image where different pixels of the displayed image are represented by angles of corresponding rays of image light, the rays carrying optical power levels and/or color composition corresponding to brightness and/or color values of the image pixels.

The pupil replicator 410 may provide multiple laterally displaced or laterally offset parallel portions or sub-beams of the scanned light beam 412 propagating in the same directions, as illustrated. The viewer's eye 404 may receive the light field 408 and form an image at the eye's retina 402 from the corresponding replicated sub-beams. A linear position of the beam portions on the eye's retina 402 may correspond to the beam angles or directions of the scanned light beam 412. In this manner, the eye 404 may form an image in linear domain on the eye's retina 402 from the image in the angular domain formed by the light field 408. It should be noted that in FIG. 1, the beam scanner 414 and the eye are on opposite sides of the pupil replicator 410. In some examples, a projector system may illuminate the pupil replicator 410 from the eye-side. The principles described herein may also apply to non-lightguide combiners. For example, the principles of this disclosure may apply to elliptical or holographic combiners.

Figure 4B:
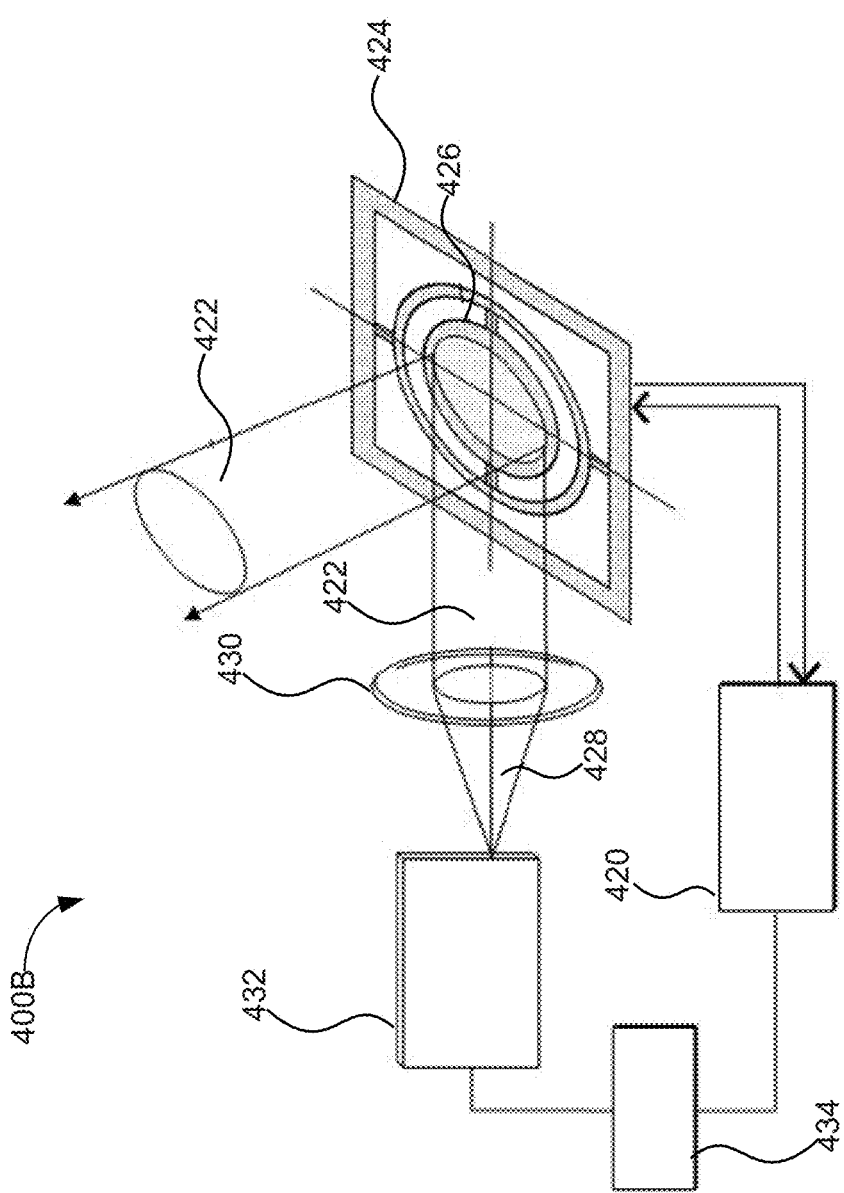
FIG. 4B illustrates a schematic view of a scanning image projector of the near-eye display of FIG. 4A, where the scanning image projector uses a 2D tiltable micro-electro-mechanical system (MEMS) reflector, according to an example.

FIG. 4B illustrates a schematic view of a scanning image projector of the near-eye display of FIG. 4A, where the scanning image projector uses a 2D tiltable micro-electromechanical system (MEMS) reflector, according to an example. A scanning projector 400B in FIG. 4B includes a light engine 432 coupled to a beam scanner 424. The light engine 432 may include a single emitter or an array of emitters for providing a diverging light beam 428 of different brightness, color composition, etc. A collimator 430 may optically coupled to the light engine 432, to collimate the diverging light beam 428 optionally and provide a collimated light beam 422, which is optically coupled to the beam scanner 424. The collimator 430 may be a lens or any other optical component having optical power, that is, focusing or collimating power, such as a concave mirror, a diffractive lens, a folded-beam freeform optical element, etc. The reflector 426 of the beam scanner 424 may be optically coupled to the collimator 430 for receiving and angularly scanning the collimated light beam 422 to form the image in angular domain.

In some examples, the controller 420 may be operably coupled to an electronic driver 434, which is coupled to the light engine 432. The controller 420 may be coupled to the beam scanner 424 for controllable tilting of the reflector 426 through 2D micro-electromechanical system (MEMS) scanning. The electronic driver 434 may be configured to provide powering electric signals to energize different emitters of the light engine 432.

In an example operation, the controller 420 may send commands to the electronic driver 434 to energize the light engine 432 in coordination with tilting the beam scanner 424, for providing, or "painting", an image in angular domain. When viewed by a human eye, the image in angular domain is projected by the eye's cornea and lens to become a spatial-domain image on the eye's retina, as explained above. In some examples, the beam scanner 424 may be replaced with a pair of 1D tiltable mirrors, one for scanning about X-axis, and the other for scanning about Y-axis. The two 1D tiltable mirrors may be optically coupled via a pupil relay, for example. Other types of scanners may also be used. The light engine 432 may include single-mode or multimode emitters, for example and without limitation side-emitting laser diodes, vertical-cavity surface-emitting laser diodes, superluminescent light-emitting diodes, light-emitting diodes, etc.

Figure 5:
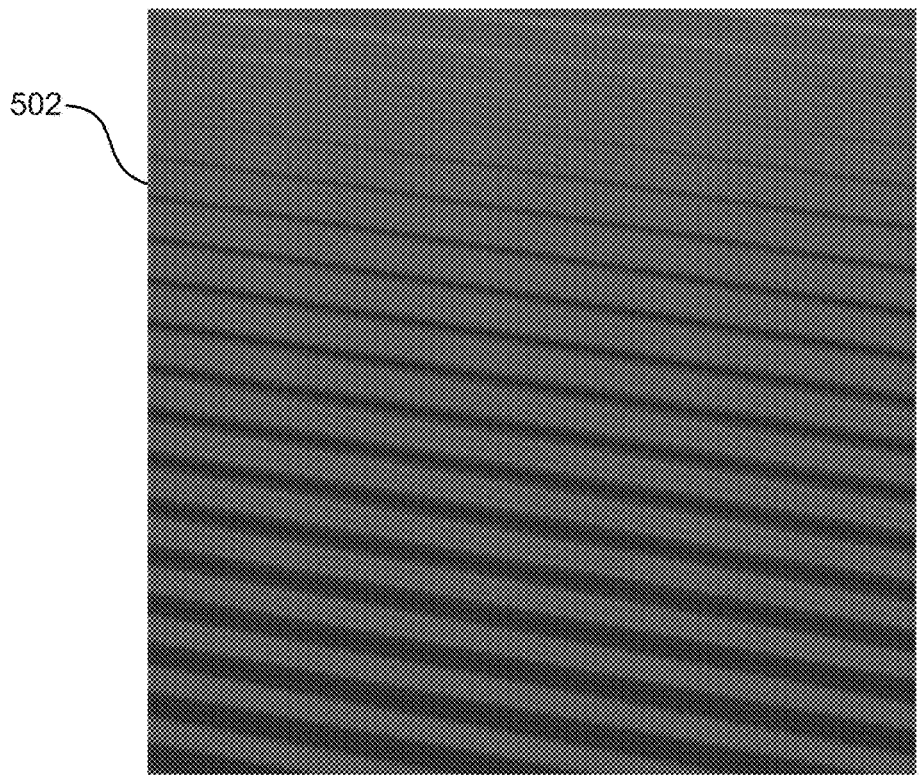
FIG. 5 illustrates a non-linear scan without and with static uniformity correction, according to an example.
Figure 5:
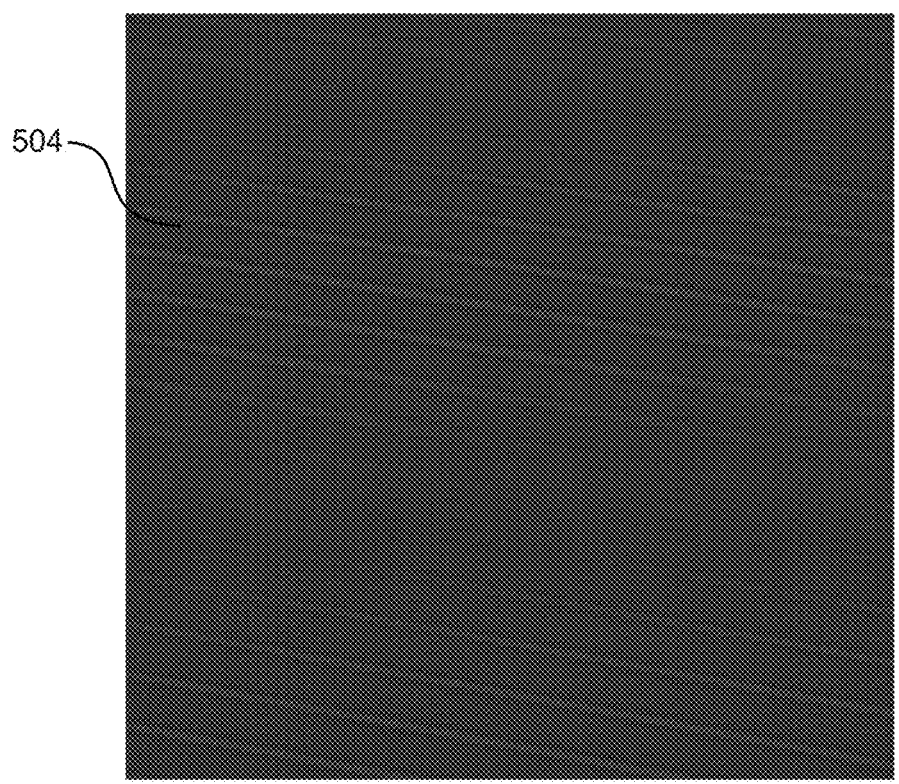

FIG. 5 illustrates a non-linear scan without and with static uniformity correction, according to an example. Diagram 500 shows an uncorrected scan 502 where interchanging dark and bright lines result from a painting direction and velocity not being uniform over the field of view (FOV). The diagram 500 also show a corrected scan 504, where through the use of firing event correction factors brightness variation may be reduced or minimized.

Lissajous scanning uses a bi-resonant micro-electromechanical system (MEMS) mirror, where X and Y directions have a sinusoidal oscillation. When using a single laser source, if the firing events occur on a regular clock rate (e.g., 200 MHz) with the same pulse energy setting, the periodic firing may naturally cause a brightness variation over the field of view (FOV), that is more brightness the further away from a field of view (FOV) center. In implementations, where closely spaced multi-emitters (e.g., spaced by a few arcmin) are used and a local micro-electromechanical system (MEMS) painting direction and velocity on the screen are not the same over the field of view (FOV), an additional "stripe-like" artifact may be created. These effects may result in a static non-uniformity of the display, different from a waveguide non-uniformity, which is in addition eye-pupil dependent.

To mitigate the static non-uniformity, correction factors for pulse events during one frame time may be determined in a non-linear scanning projector (e.g., Lissajous scanner). In one approach, a set of input parameters such as scan angle, micro-electromechanical system (MEMS) obliquity, ridge spacing, etc. may be used to optimize color-wise luminance uniformity. In another approach, pulse correction factors may be determined using a custom-defined cost function that attempts to optimize for both luminance and color uniformity.

Figure 6A:
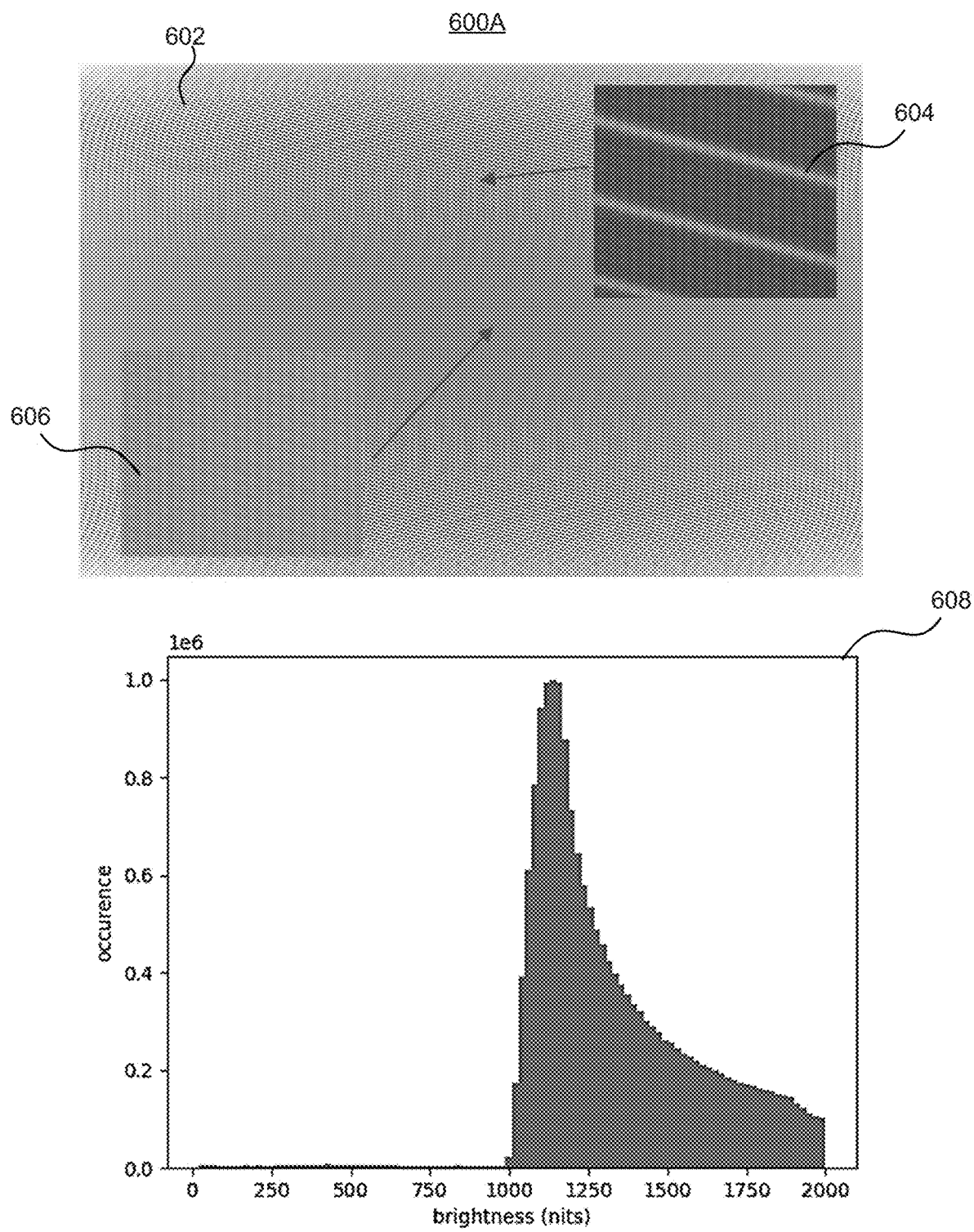
FIG. 6A-6B illustrate static non-uniformity and correction results employing analytic approach, according to an example.
Figure 6B:
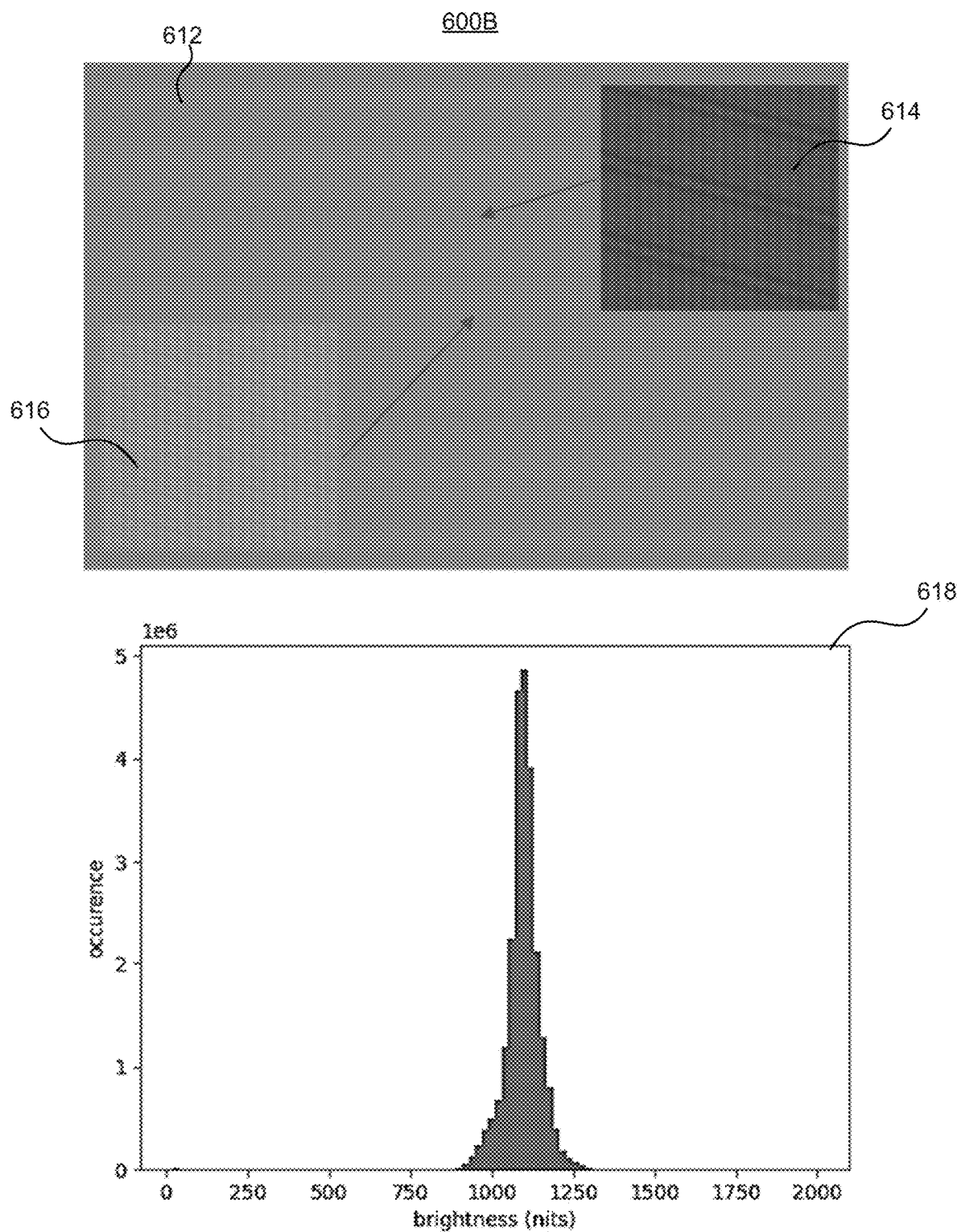

FIG. 6A-6B illustrate static non-uniformity and correction results employing analytic approach, according to an example. Diagram 600A in FIG. 6A shows a display capture 602 resulting from non-linear scan with two enlarged segments 604 and 606. As the diagram shows, the further away from a center of the field of view (FOV) (e.g., enlarged segment 604) the more pronounced the static non-uniformity. The display capture 602 is from a 0.5 grayscale source image and a result of eight ridges aligned vertically, spaced by 4.8 arcmin, with a 200 MHz clock and a 60×40 field of view (FOV) (MEMS dimension: 72×40). Diagram 600A also shows a histogram 608 of brightness values across the image, where target is 1000 nits. The spread of the brightness represents the static non-uniformity.

Diagram 600B in FIG. 6B shows a display capture 612 of a corrected version of the image of 600A using analytic approach resulting from non-linear scan with two enlarged segments 614 and 616. As the diagram shows, even the further away from the center of the field of view (FOV) detail (e.g., enlarged segment 614) has substantially less static non-uniformity. The display capture 612 is also a result of eight ridges aligned vertically, spaced by 4.8 arcmin, with a 200 MHz clock and a 60×40 field of view (FOV) (MEMS dimension: 72×40). The histogram 618 of brightness in diagram 600B shows how brightness values are focused around the target 1000 nits.

Figure 6C:
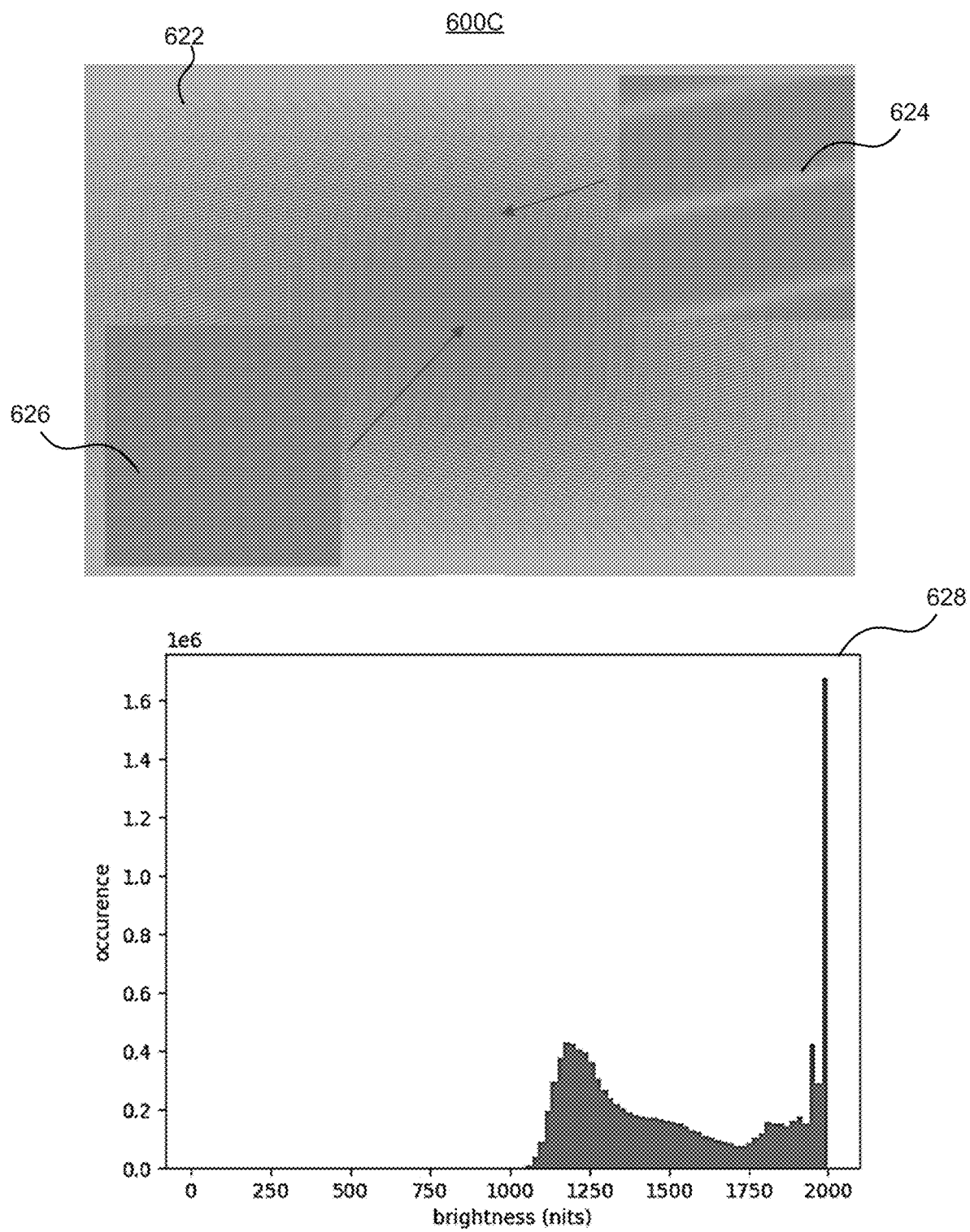
FIGS. 6C-6D illustrate static non-uniformity and correction results employing optimization approach, according to an example.
Figure 6D:
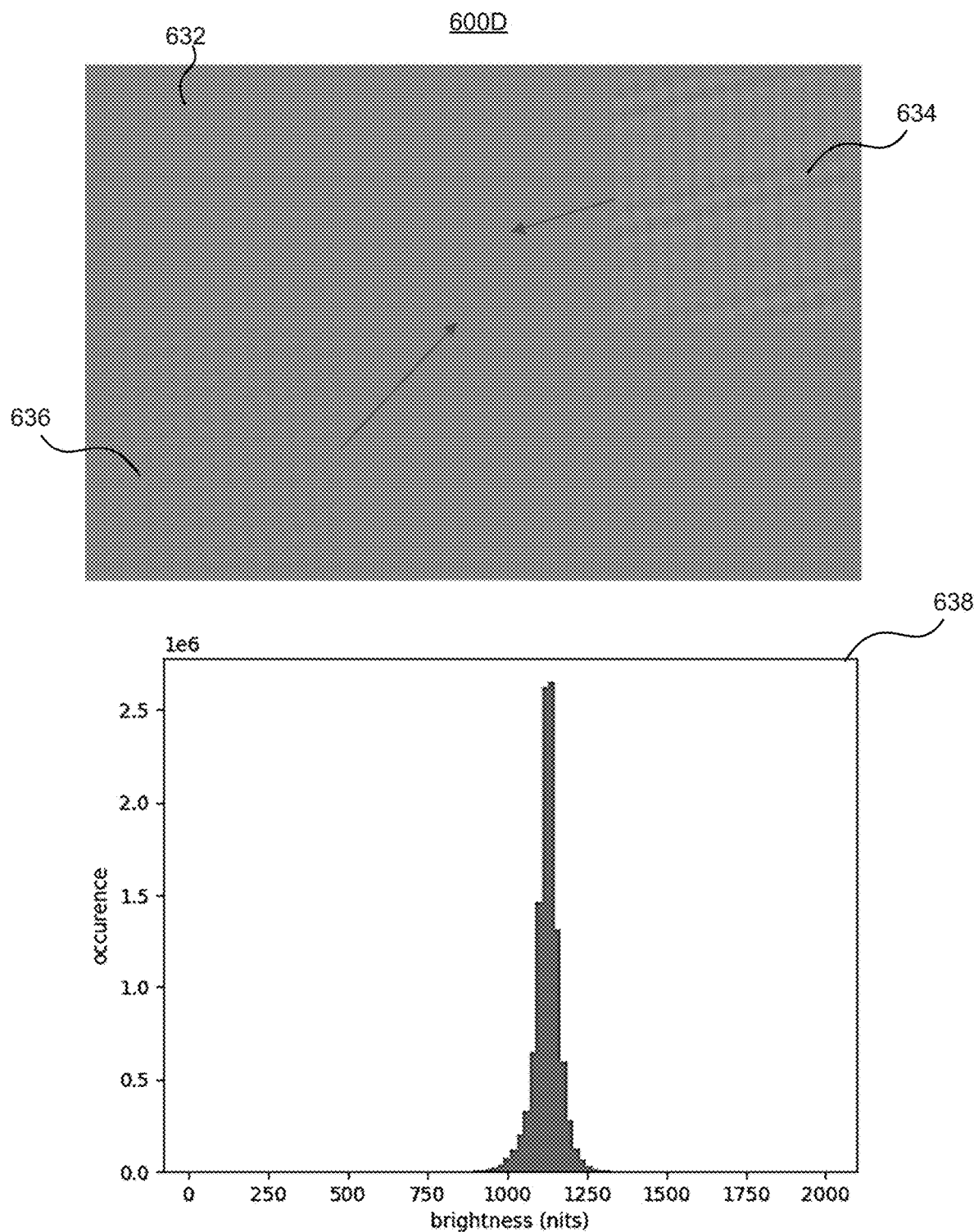

FIGS. 6C-6D illustrate static non-uniformity and correction results employing optimization approach, according to an example. Diagram 600C in FIG. 6C shows a display capture 622, similar to that in FIG. 6A, resulting from non-linear scan with two enlarged segments 624 and 626. As the diagram shows, the further away from a center of the field of view (FOV) (e.g., enlarged segment 624) the more pronounced the static non-uniformity. The display capture 622 is from a 0.5 grayscale source image with a 2.2 Gamma value and a result of eight ridges aligned vertically, spaced by 4.8 arcmin, with a 200 MHz clock and a 60×40 field of view (FOV) (MEMS dimension: 72×40). Diagram 600C also shows a histogram 628 of brightness values across the image, where target is 1000 nits. The spread of the brightness represents the static non-uniformity.

Diagram 600D in FIG. 6D shows a display capture 632 of a corrected version of the image of 600C using optimization approach resulting from non-linear scan with two enlarged segments 634 and 636. As the diagram shows, even the further away from the center of the field of view (FOV) detail (e.g., enlarged segment 634) has substantially less static non-uniformity. The display capture 632 is also a result of eight ridges aligned vertically, spaced by 4.8 arcmin, with a 200 MHz clock and a 60×40 field of view (FOV) (MEMS dimension: 72×40). The histogram 638 of brightness in diagram 600D shows how brightness values are focused around the target 1000 nits similar to the histogram 618 in diagram 600B.

Figure 7A:
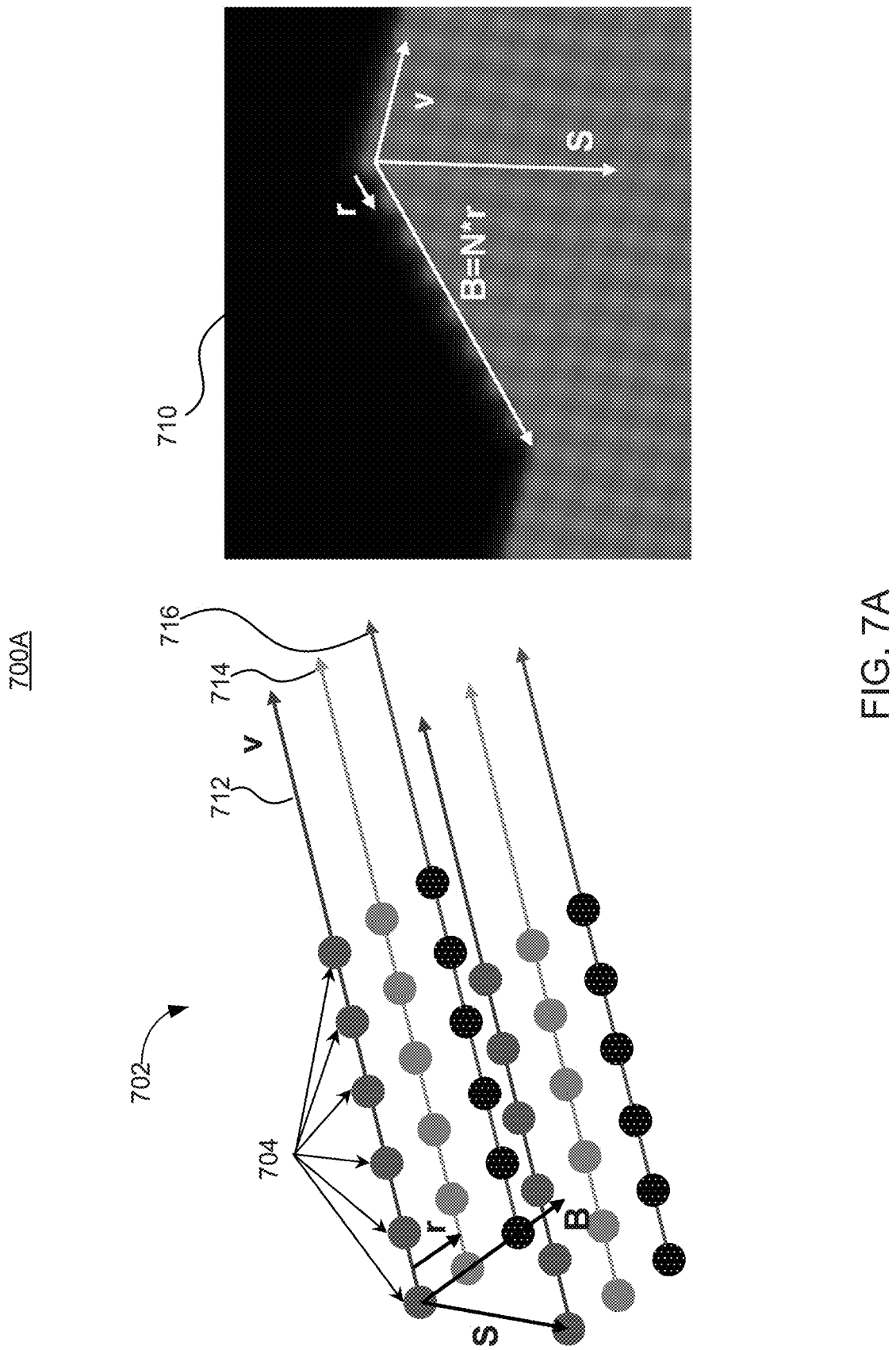
FIG. 7A illustrates painting parameters on a diagram of pulse firing events with multiple ridges and an example image from an image painter, according to an example.

FIG. 7A illustrates painting parameters on a diagram of pulse firing events with multiple ridges and an example image from an image painter, according to an example.

In the analytic approach, the coordinate system is screen space, parameterized with field of view (FOV) coordinates x, y. Any local area within the field of view (FOV) may be fully described by three vectors: a local painting velocity vector: v, a brush-width: B (which is a number of ridges N multiplied by the vector "r" connecting adjacent ridges), and a skip per horizontal period: S (where the scanner is painting next time it visits that local field of view (FOV) area). Diagram 700A shows the parameterization vectors v, r, A, and B on a representation of pulse firing events of the same source 704 (separated by one clock period) and ridges 712, 714, 716. Diagram 700A also shows an example image 710 from image painter along with the parameterization vectors.

The analytic approach for a general case may be challenging because the three vectors (v, B, S) have no relation to each other (i.e., they are not parallel). In addition, the vectors are functions of x and y: v=v(x,y), and four possible values: v=(+/−v_x, +/−v_y); B=v(x,y); S=v(x,y). The reason for this is the curved Lissajous pattern itself, the presence of image distortion on the screen, and the fact that the ridges may have an arbitrary angle with respect to vertical/horizontal directions.

Figure 7B:
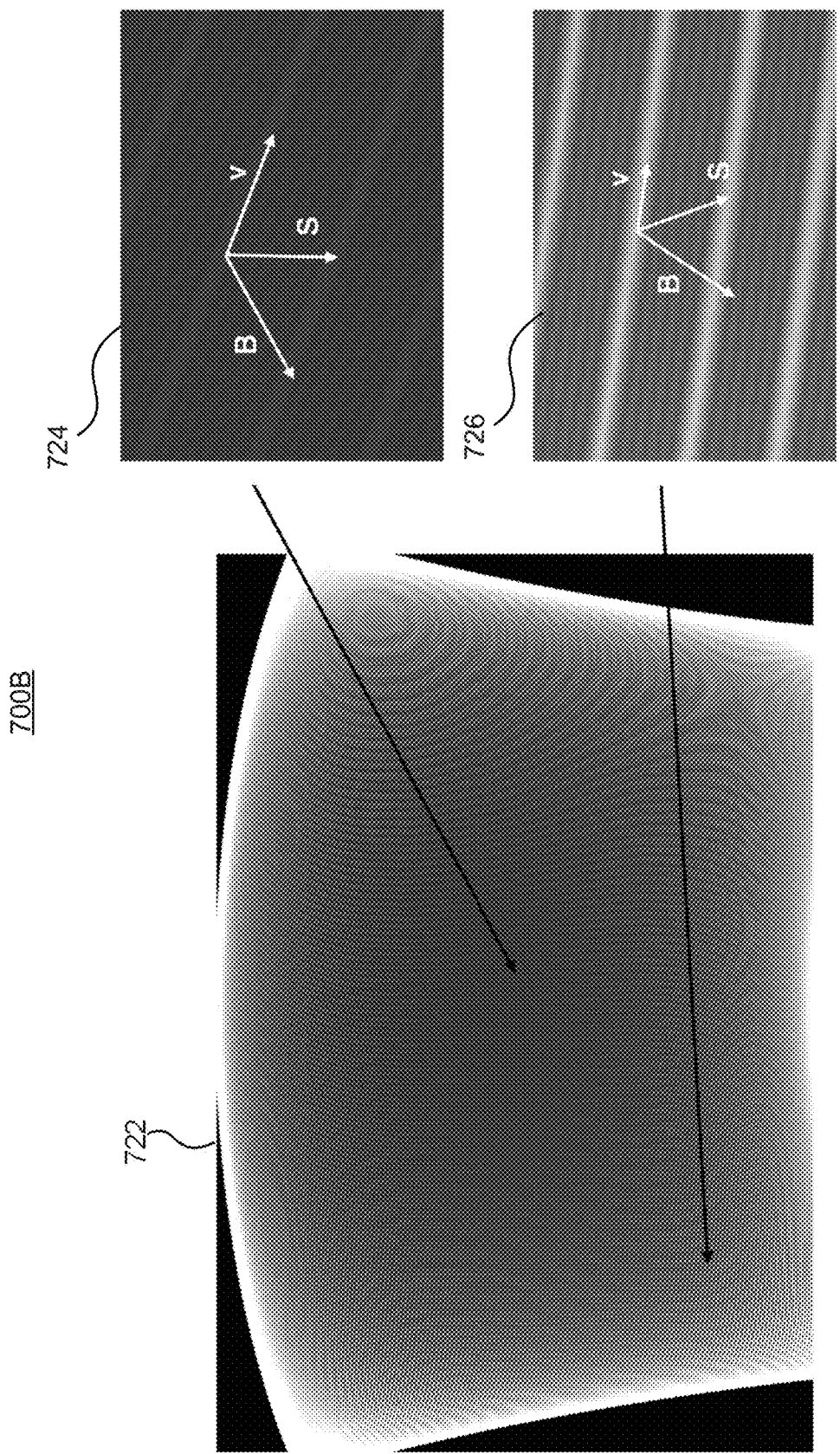
FIG. 7B illustrates change of painting parameters over a field of view (FOV), according to an example.

FIG. 7B illustrates change of painting parameters over a field of view (FOV), according to an example. Diagram 700B shows an example image 722 (created through non-linear scanning) without correction and two detail segments 724 and 726 with their respective parameterization vectors, v, B, and S. As the detail segments 724 and 726 show, the relationship between the vectors v, B, and S changes depending on a location within the field of view (FOV).

In both approaches, the analytical and the optimization, a goal is to introduce brightness correction factors for each firing event, such that the brightness (and color) is as uniform as possible. Because the pattern of firing spots may look locally the same (i.e., periodic), the correction factor for a given ridge may be the same between firing events in that local region. Correction factors may be obtained for each ridge, which in general may depend on the three vectors, meaning the vectors are a function of field of view (FOV) position x, y. For example:

$$\text{Correction\_ridge1} = \text{Correction\_ridge1}(v, B, S) = \text{Correction\_ridge1}(x, y)$$

$$\text{Correction\_ridge2} = \text{Correction\_ridge2}(v, B, S) = \text{Correction\_ridge2}(x, y)$$

$$\text{Correction\_ridge3} = \text{Correction\_ridge3}(v, B, S) = \text{Correction\_ridge4}(x, y)$$

etc.

In some examples, each correction factor may be a number between 0 and 1. Resulting correction maps may be stored in a memory associated with the display device (e.g., near-eye display device). Alternatively, the correction factors may be represented as a long vector, where the entries are the corrections for consecutive firing events (assuming Lissajous pattern repeats perfectly). For example:

$$\text{Correction\_ridge1} = \text{Correction\_ridge1}(t) = [\text{many numbers}]$$

-continued

Correction_ridge2 = Correction_ridge2(*t*) = [many numbers]

etc.

Based on implementation factors, following simplifications may be employed in the analytical technique. Image distortion may be neglected (i.e., MEMS gimbal angles=x, y coordinates). Ridges may be aligned vertically or horizontally. Moreover, system clock frequency may be selected an integer multiple of micro-electromechanical system (MEMS) X-oscillation frequency. The simplification of the computation system may have following consequences. The brush-width vector B may be constant over the full field of view (FOV) with only a y-component (B=const=(0,B)). Skip S and brush-width B may be parallel across the entire field of view (FOV) (S=(0,S)). And, Skip S may be merely a function of vertical position (S=S (y)=(0,S (y))). However, micro-electromechanical system (MEMS) velocity vector may still vary over the field of view (FOV) (v=v(x,y)).

Accordingly, in a simplified case, the vectors may be v=v(x,y), r, B=4r (constant), and S=S(y). Closed expressions for S y) and v(x,y) may be easily derived. In the simplified analytical case, brightness correction factors may be determined following a three-step technique. In a first step, vertical brightness uniformity may be fixed ("overlapping brush strokes"). Because of the symmetry of the painting locations, the computation may be reduced to a one-dimensional computation by considering only the vertically aligned firing locations. In the first step, the velocity vector does not matter, meaning correction factor is only a function of S and B. Because B is constant and S only varies with y, the initial correction may be expressed as:

Correction_ridgeN_step1 = Correction_ridgeN_step1(*y*)   (1)

In a second step, horizontal brightness uniformity may be fixed ("Lissajous sinusoid"). Because absolute painting velocity changes over the field of view (FOV), the spot density may change even after the overlapping brush strokes are corrected. And, because painting is synchronized to X micro-electromechanical (MEMS) motion and image distortion is neglected, only the velocity x component may be relevant in this step, which itself is only a function x. Therefore, the correction in second step may be expressed as:

Correction_ridgeN_step2 = Correction_ridgeN_step2(*x*)   (2)

Step 3 may yield the final correction factor as a product of the corrections determined in the first steps. Thus, in the simplified case, the correction may factorize as:

Correction_ridgeN(*x*, *y*) =   (3)

Correction_ridgeN_step1(*y*) * Correction_ridgeN_step2(*x*)

Figure 8A:
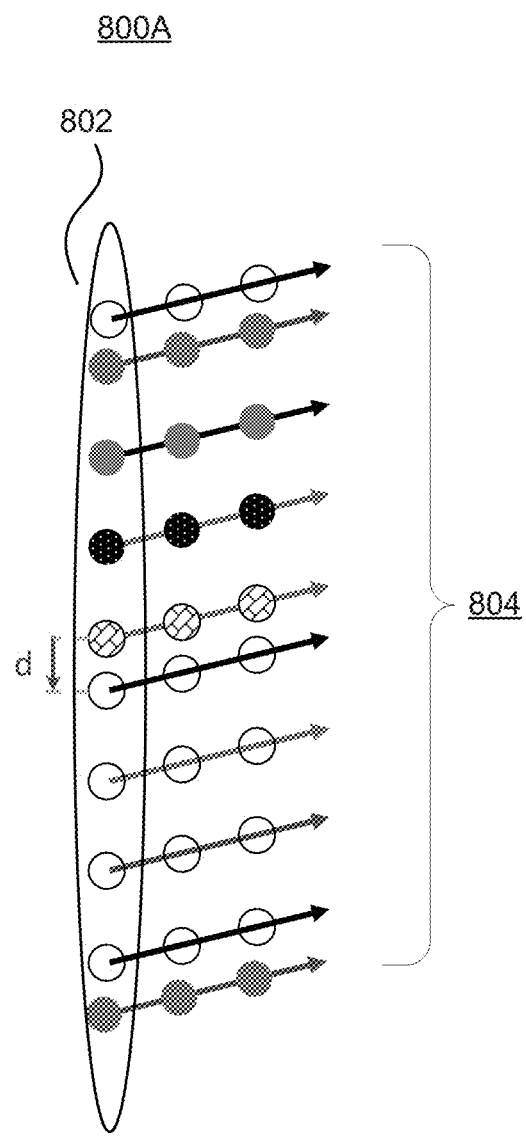
FIGS. 8A-8C illustrate determination of vertical uniformity correction factors for a non-linear scanner with multiple ridges employing the analytical approach, according to an example.
Figure 8B:
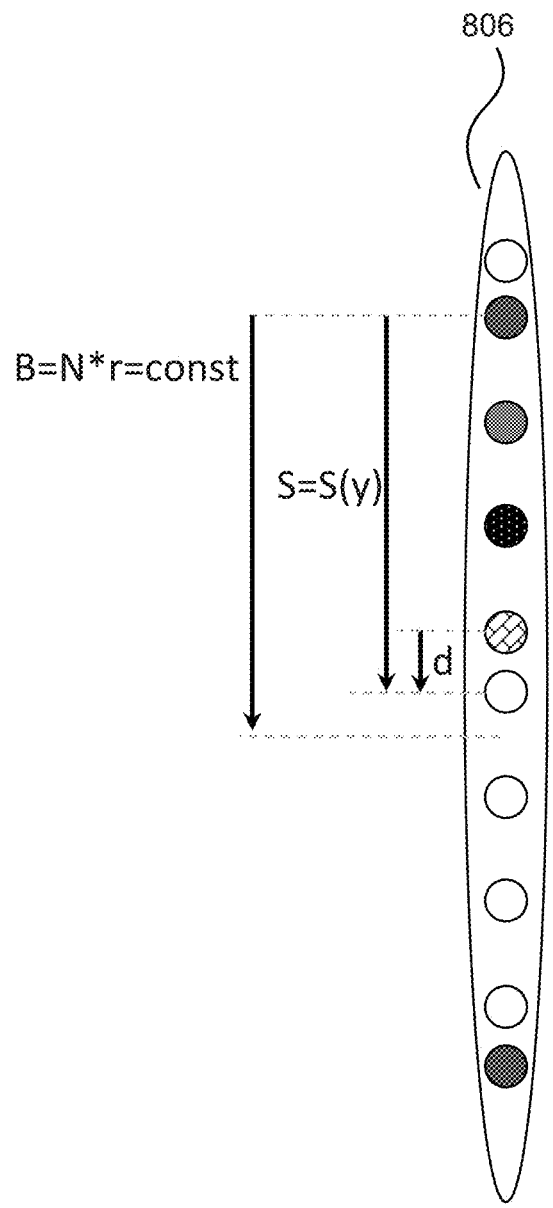
Figure 8C:
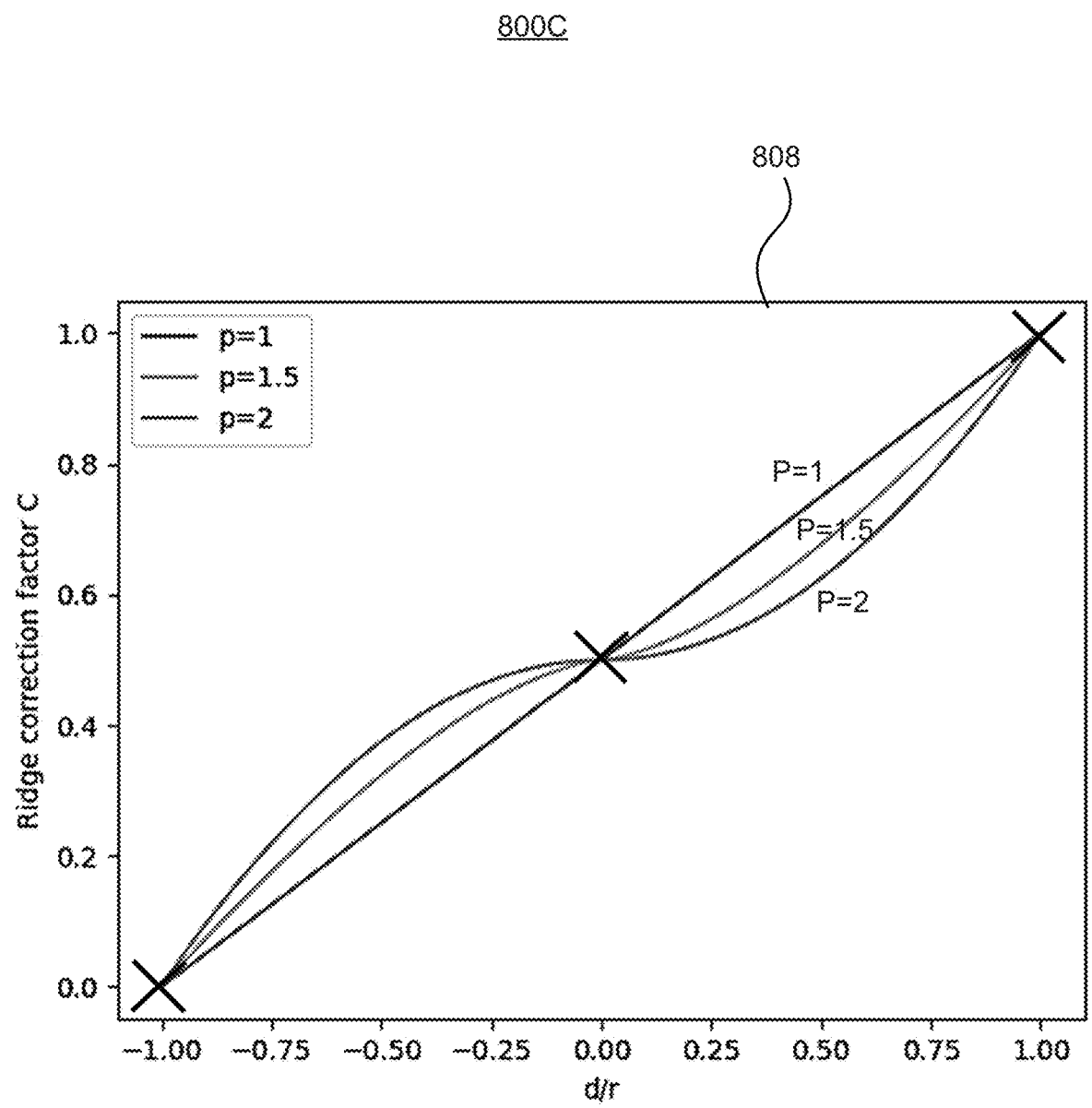

FIGS. 8A-8C illustrate determination of vertical uniformity correction factors for a non-linear scanner with multiple ridges employing the analytical approach, according to an example.

Diagram 800A in FIG. 8A shows currently fired and next-to-be fired emitters 802 along their respective ridges 804 for each color (e.g., gray, red, blue, green). To correct the vertical brightness variation following strategy may be employed. There are two important ridges: the first ridge (gray) and the last (or $n^{th}$) ridge (green) of a brush stroke. The correction factors may be a function of the distance d between the first and last ridges. Thus, a correction factor may be introduced for the first and last ridges. Because of symmetry, the same correction factor C may be set for the first and last ridges.

The computation may, thus, be reduced to finding a function C(d/r), where d/r is the distance between "brush strokes" normalized to the ridge spacing. It should be noted that the described technique is one possible strategy, several others, for example, adjusting all ridges, not just the first and last, may also be employed.

In an ideal scenario C(d/r=1)=1.0 is desired, as in that case no correction is needed. Furthermore, C(0)=0.5 may also be needed, as this provides a regular pixel pattern, which corresponds to the ideal solution. Finally, C(d/r=−1)=0 may also be needed, as only the first and last ridges are corrected. At that point, the second ridge may be called the first one, and the second to last one may be called the last one, which means setting d/r=1 again. With these assumptions, ridge spacing d may be determined from:

$$\frac{d(x,y)}{r} = \frac{d(y)}{r} = 1 - \left(\frac{B-S(y)}{r}\right) \mod 2 \quad (4)$$

$$S(y) = \frac{FOV_y}{2}\sin\left(\sin^{-1}\left(\frac{2y}{FOV_y}\right) + R*2\pi\frac{v_y}{v_x}\right) - y \quad (5)$$

where R represents horizontal periods for a nearby paintbrush (1 for 1:1, 2 for 1:2 frequency ratio MEMS).

Diagram 800B in FIG. 8B shows emitters 806 with B=N*r (constant), S=S(y), and d (ridge spacing). It may be reasonable to assume C(d/r) is point symmetric around (0,0.5). One possible way to parameterize different options with a power law with exponent p is as follows:

$$C_1\left(\frac{d}{r}\right) = \begin{cases} 0.5(d/r)^p + 0.5, & \text{if } \frac{d}{r} \geq 0 \\ -0.5(-d/r)^p + 0.5, & \text{if } \frac{d}{r} < 0 \end{cases} \quad (6)$$

$$C_1(x,y) = C_1\left(\frac{d(x,y)}{r}\right) \quad (7)$$

Diagram 800C in FIG. 8C shows graph 808 representing a variation of ridge correction factor C as a function of d/r for p=1, p=1.5, and p=2. Alternatively, an optimization goal may be introduced, and an optimal correction for each d/r may be determined.

Figure 9:
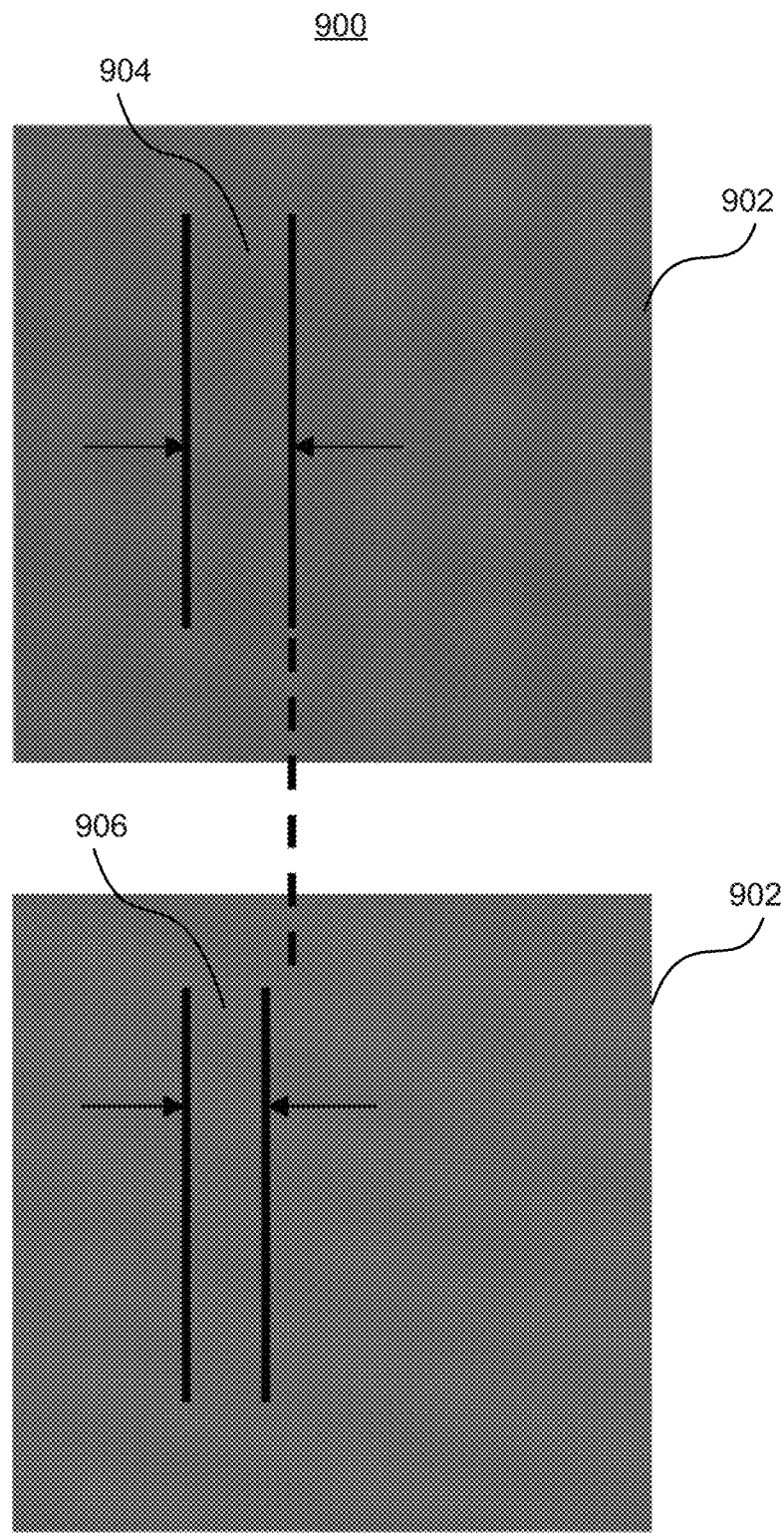
FIG. 9 illustrates correction of horizontal uniformity following the determination of the vertical uniformity correction factors, according to an example.

FIG. 9 illustrates correction of horizontal uniformity following the determination of the vertical uniformity correction factors, according to an example. Diagram 900 shows correction of horizontal non-uniformity by adjusting horizontal spacing of adjacent pulses 904, 906 on the vertically corrected image 902. Originating from sinusoidal micro-electromechanical (MEMS) motion, tighter spacing occurs between adjacent pulses on the screen for larger distances to frustum center. To maintain uniform display brightness, the (local) pulse brightness may be multiplied by the inverse of the relative horizontal spacing of adjacent pulses. The horizontal correction factor may be expressed as the x-component of the local painting velocity relative to the value in the frustum center:

$$C_2(x, y) = \frac{v_x(x)}{v_x(0)} = \sqrt{1 - \left(\frac{x}{x_0}\right)^2} = \cos(\omega_x t) \quad (8)$$

A final correction factor may then be determined as a product of the vertical and horizontal correction factors:

$$C(x, y) = C_1(y)C_2(x) \quad (9)$$

Figure 10A:
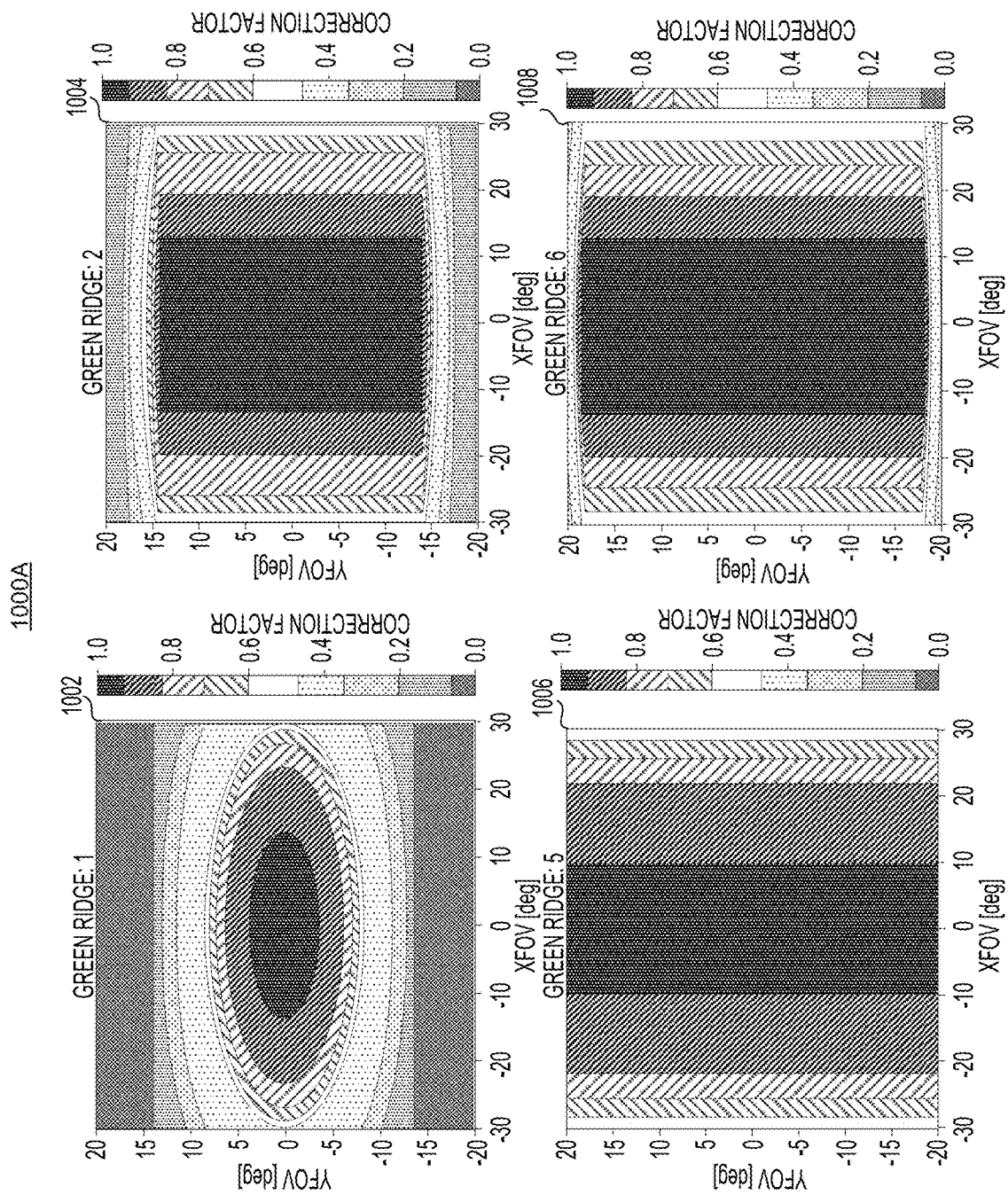
FIGS. 10A-10B illustrate example correction factor maps determined employing analytic approach, according to an example.
Figure 10B:
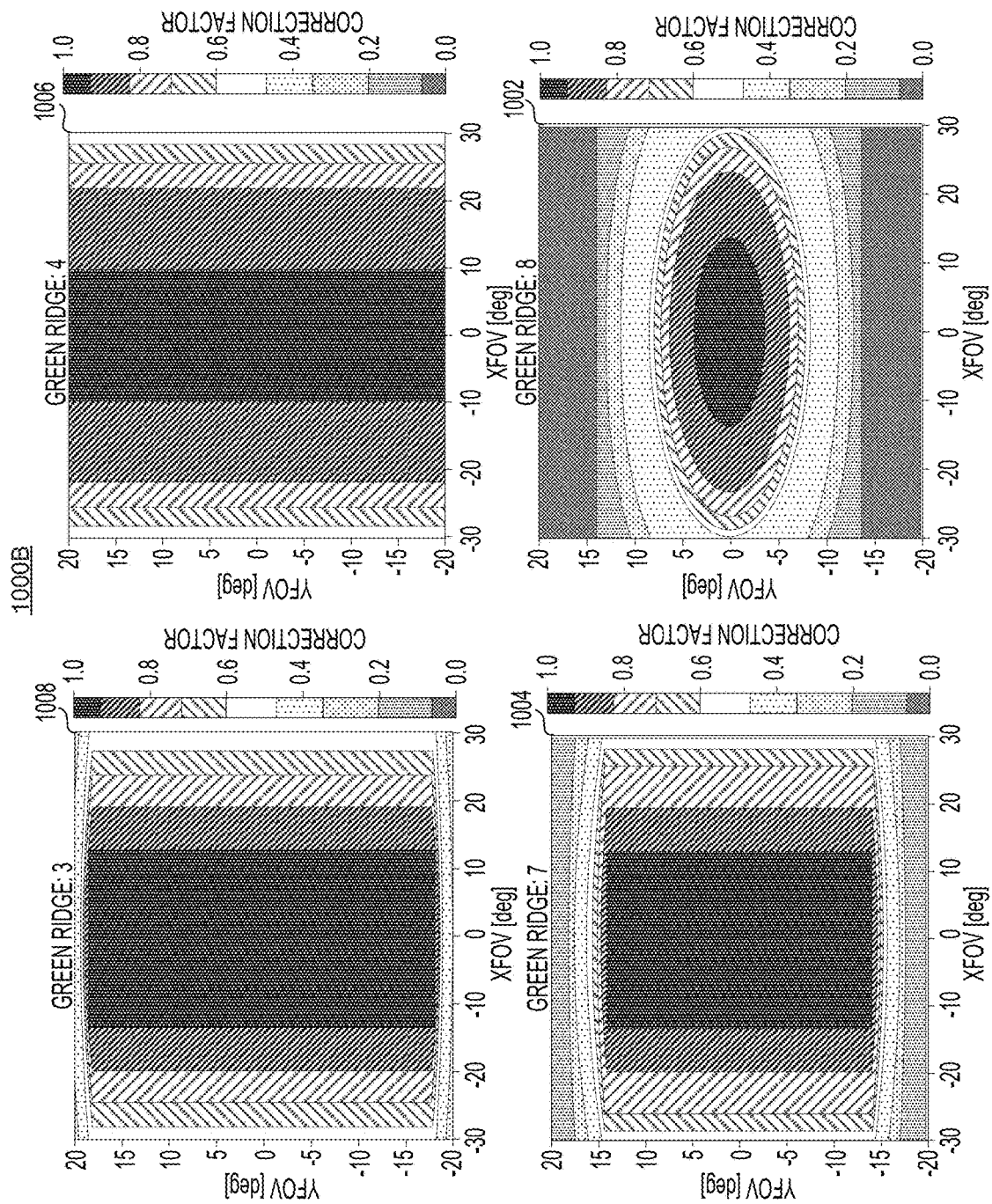

FIGS. 10A-10B illustrate example correction factor maps determined employing analytic approach, according to an example. Diagrams 1000A and 1000B in FIGS. 10A and 10B show correction factor maps 1002 through 1018. As discussed herein, correction factors may be determined for each pulse event during one frame time in a non-linear scanning projector. The correction factor maps 1002 through 1018 show (continuous) correction factors for each emitter of the same color (e.g., green) along eight different ridges. The example implementation is for a projector with eight ridges aligned vertically, spaced by 4.8 arcmin, 200 MHz clock, and 60×40 FOV (MEMS: 72×40). As the maps indicate there is a symmetry between the first and last ridges.

To extend the herein described simplified technique to a more general case with distortion and rotated ridges, a line non-uniformity correction may be employed. In most of the field of view (FOV) region, rather than the individual spots, lines may be seen (see e.g., diagram 700B in FIG. 7B). Thus for each field of view (FOV) location (x,y), the true vectors S, B, v may first be computed, and then the projection Sy, By may be determined along y direction with the projection vector v. As this approach is similar to the simplified approach, the correction factors may be computed as discussed above.

In the optimization approach, pixels of a rendered image may be used to determine which direction to scale pulses (parameter to be optimized being the individual scaling multipliers of the pulses). A loss function and gradients may be determined and provided to an optimizer.

Figure 11:
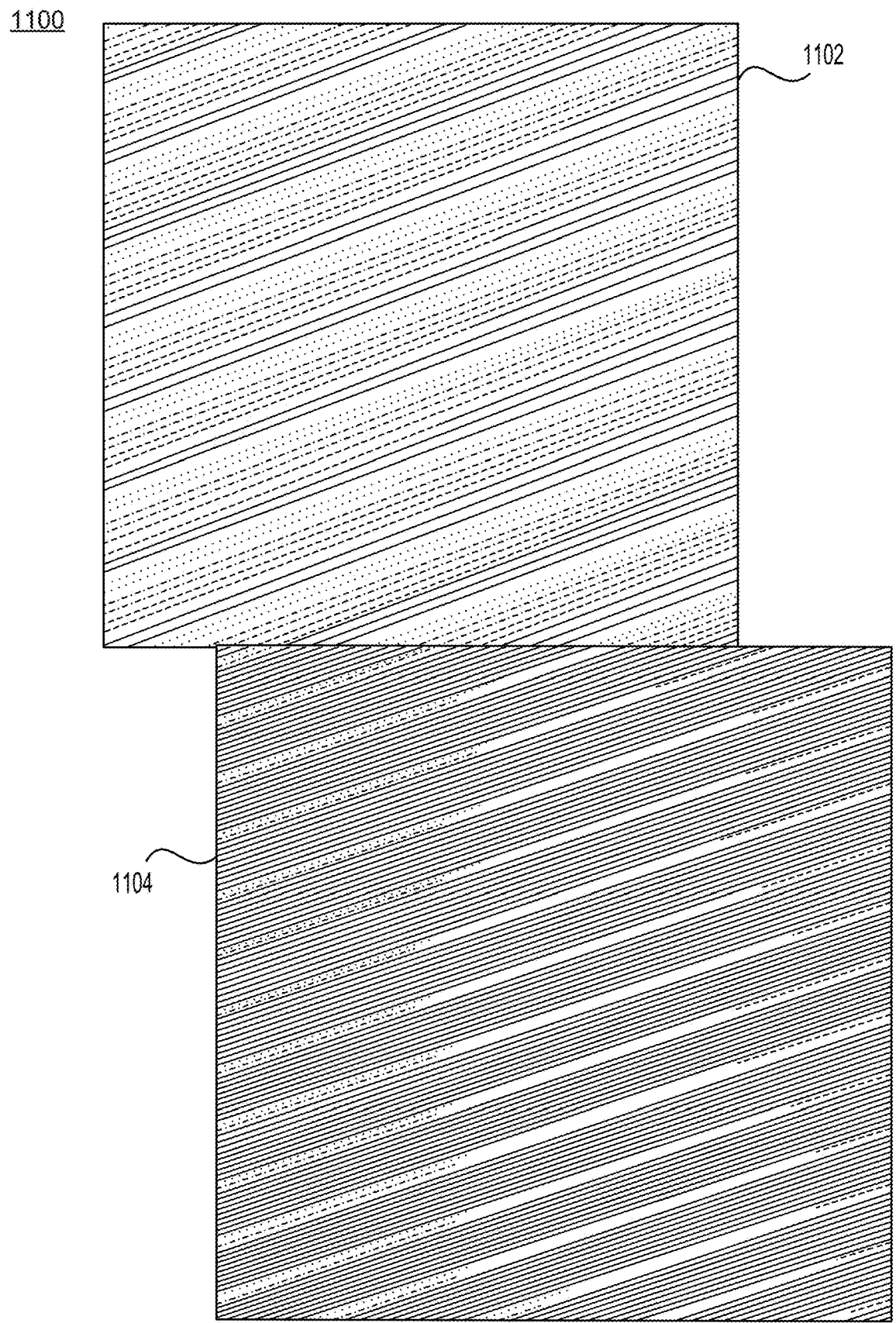
FIG. 11 illustrates two example scanned images with color pixels and luminance stripes, according to examples.

FIG. 11 illustrates two example scanned images with color pixels and luminance stripes, according to examples. Diagram 1100 shows a non-linearly scanned image 1102 with color pixels and another image 1104 with luminance. Some colored pixels may have too much energy of one color channel with respect to the other channels. Thus, the pixels have high "intra pixel variance" loss. The gradient for only the color channels that have high "intra pixel variance" loss may have high values.

In the luminance image, the striped areas may have too much energy relative to a target in general. Thus, they have high luminance loss. The gradient for all color channels of these pixels may have high values, but the other pixels that are the correct brightness may have near zero values. In some examples, a loss function that is a simple sum over pixels may be used to make the function independently computable over parts of the image. Thus, the loss function may be defined in terms of a single output pixel:

$$\text{Loss(pixel)} = \text{var(pixel)} + (\mu - \mu_{target})^2 \quad (10)$$

where var(pixel) represents intra-pixel variance to reward good color quality (e.g., grey is better than red), and a target brightness ($\mu_{target}$) may be used to penalize luminance deviation that is either too bright or too dim in the optimization.

A less simplified loss function may be expressed as:

$$\text{Loss}_{pxl}(ij) = \\ \frac{w}{2}(r_{ij} - \mu_{ij})^2 + \frac{w}{2}(g_{ij} - \mu_{ij})^2 + \frac{w}{2}(b_{ij} - \mu_{ij})^2 + \frac{1}{2}(\mu_{ij} - \mu_{target})^2 \quad (11)$$

where r, g, b are color channel energy collections, and $\mu$ is their average. A tunable weight, w, may be attached to color variations to control how much the system values each variation.

The gradients may be computed through the derivative with respect to the scaling vector:

$$\nabla \text{Loss}_{img} = \frac{\partial \text{Loss}_{img}}{\partial \vec{s}} = \left[\sum_{ij} \frac{\partial \text{Loss}_{pxl}(ij)}{\partial s_0}, \ldots, \sum_{ij} \frac{\partial \text{Loss}_{pxl}(ij)}{\partial s_m}\right] \quad (12)$$

where $$\frac{\partial \text{Loss}_{pxl}(ij)}{\partial s_{r,k}} = w(r_{ij} - \mu_{ij})\left(\frac{\partial r_{ij}}{\partial s_{r,k}} - \frac{\partial \mu_{ij}}{\partial s_{r,k}}\right) + (\mu_{ij} - \mu_{target})\frac{\partial \mu_{ij}}{\partial s_{r,k}} \quad (13)$$

and $$\frac{\partial r_{ij}}{\partial s_{r,k}} = \frac{1}{\sqrt{2\pi}\, \sigma_{m,k}} \exp\left(\frac{-\|\vec{x} - \vec{p_{m,k}}\|^2}{2\sigma_{m,k}^2}\right) \quad (14)$$

Figure 12:
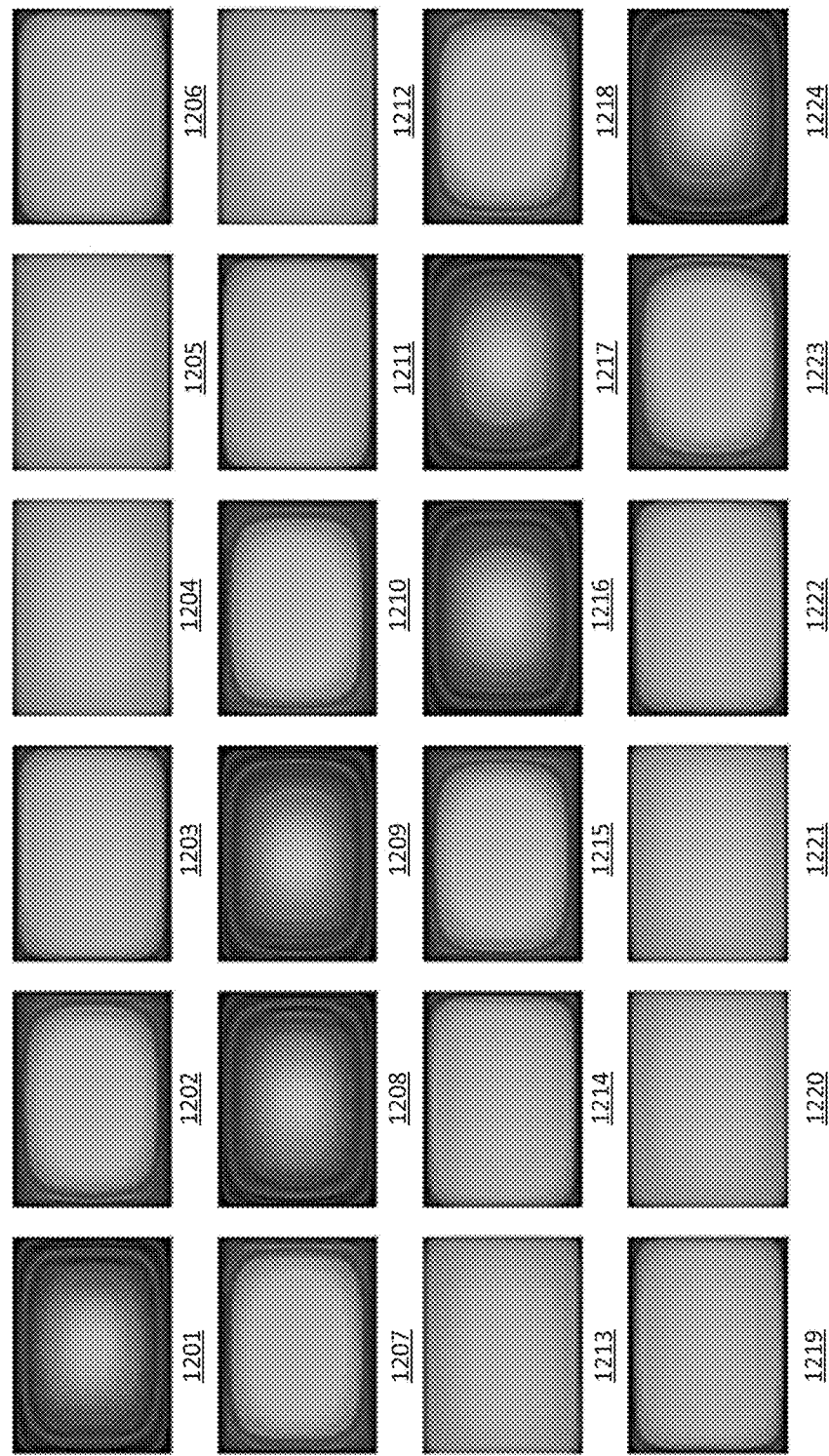
FIG. 12 illustrates example correction factor maps determined employing optimization approach, according to an example.

FIG. 12 illustrates example correction factor maps determined employing optimization approach, according to an example. Diagram 1200 shows correction factor maps 1201 through 1224 obtained through optimization approach for 24 different emitters.

The optimization technique is independent of distortion and/or emitter layout/orientation. The approach may also support varying PSF over the field of view (FOV), tilted ridges, separate color ridges, obliquity distortion, etc. Because optimization approach operates on pixels, a waveguide may be placed over the output image transmission, and waveguide uniformity may be corrected as well. Furthermore, luminance or color uniformity may be prioritized over each other through weights.

Figure 13:
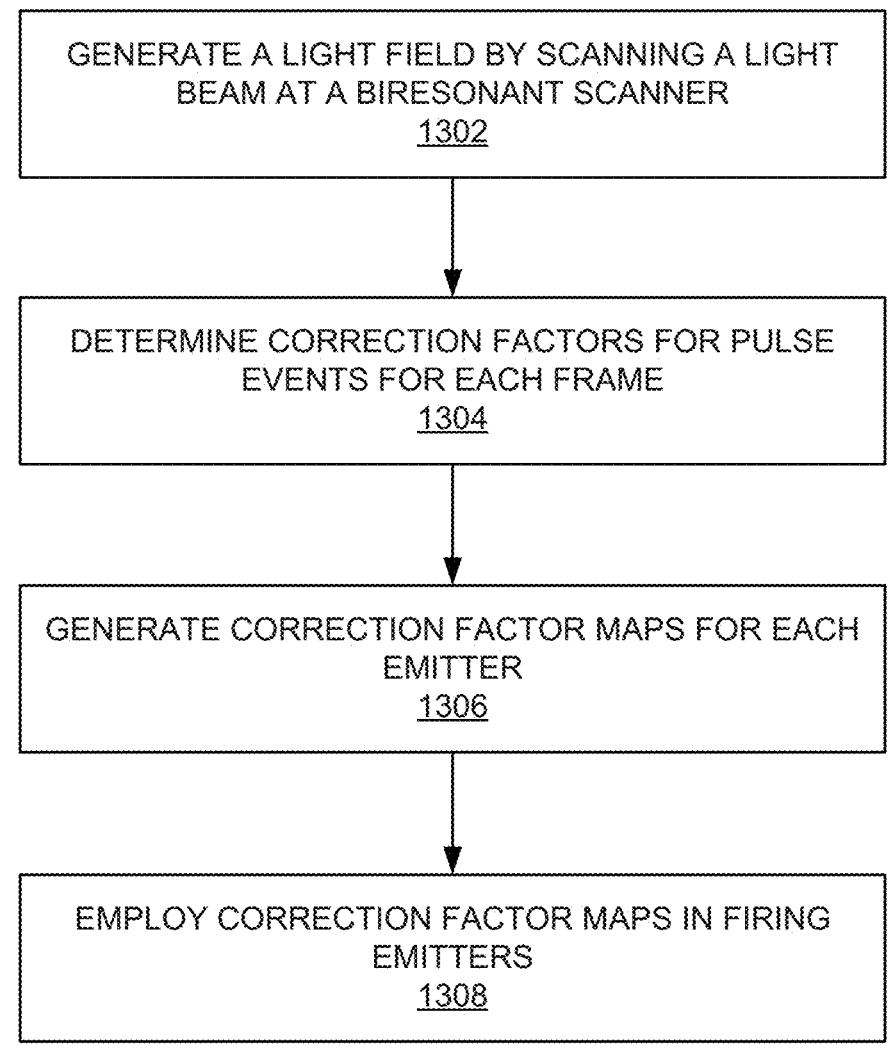
FIG. 13 is a flow diagram illustrating an example method for determining static uniformity correction factors for a scanning projector performing consecutive non-linear scan with multi-ridge light sources, according to some examples.

FIG. 13 is a flow diagram illustrating an example method for determining static uniformity correction factors for a scanning projector performing consecutive non-linear scan with multi-ridge light sources, according to some examples. The method 1300 is provided by way of example, as there may be a variety of ways to carry out the method described herein. Although the method 1300 is primarily described as being performed by the components of FIGS. 4A and 4B, the method 1300 may be executed or otherwise performed by one or more processing components of another system or a combination of systems. Each block shown in FIG. 13 may further represent one or more processes, methods, or subroutines, and one or more of the blocks (e.g., the selection process) may include machine readable instructions stored on a non-transitory computer readable medium and executed by a processor or other type of processing circuit to perform one or more operations described herein.

At block 1302, a light field may be generated through non-linear biresonant scanning (e.g., a coherent Lissajous scan). The periodic firing of light sources (e.g., laser sources) coupled with the biresonant scanning of the micro-electromechanical system (MEMS) mirror may cause static non-uniformity such as a brightness variation over the field of view (FOV).

At block 1304, correction factors may be determined for pulse events during one frame time through an analytical approach, optimizing a number of parameters for color-wise luminance uniformity, or through an optimization approach optimizing luminance and color uniformity through a custom-defined cost function.

At block 1306, correction factor maps may be generated for each emitter. In some examples, the correction factor maps may be stored in memory. The correction factor maps (or discrete values selected from the maps) may be used to control firing of the emitters at block 1308 to reduce the static non-uniformity effect(s).

According to examples, a method of making a biresonant coherent non-linear scanning based projector system with static non-uniformity mitigation is described herein. A system of making the biresonant coherent non-linear scanning based projector system with static non-uniformity mitigation is also described herein. A non-transitory computer-readable storage medium may have an executable stored thereon, which when executed instructs a processor to perform the methods described herein.

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. An apparatus, comprising:
a multi-emitter light source to provide a light beam;
a two-dimensional (2D) beam scanner optically coupled to the light source, the two-dimensional (2D) beam scanner to:
receive the light beam; and
generate a light field by performing a biresonant scan of the light beam; and
a controller communicatively coupled to the light source and the beam scanner, the controller to:
cause the beam scanner to scan the light beam about a first axis and a second axis within a field of view (FOV) following a consecutive non-linear pattern;
determine a correction factor for each firing of each emitter of the light source for each frame of an image generated by the scanned light beam; and
utilize the determined correction factor for each firing of each emitter of the light source.

2. The apparatus of claim 1, wherein the light source is a multi-ridge light source, and ridges of the multi-ridge light source are aligned horizontally or vertically.

3. The apparatus of claim 2, wherein the correction factor is determined based on at least one of a local painting velocity vector, a brush-width, a skip, a location within the FOV, or time.

4. The apparatus of claim 3, wherein the brush-width is a number of ridges of the multi-ridge light source multiplied by a vector connecting two adjacent ridges, and the skip is a vertical displacement for the ridges of the multi-ridge light source.

5. The apparatus of claim 2, wherein the correction factor is a number between 0 and 1, and correction factors for each emitter are stored in a memory as a correction factor map.

6. The apparatus of claim 2, wherein correction factors for consecutive firing events are stored as a vector.

7. The apparatus of claim 1, wherein the controller is to determine the correction factor by:
determining a vertical brightness uniformity correction factor;
determining a horizontal brightness uniformity correction factor; and
multiplying the vertical brightness uniformity correction factor and the horizontal brightness uniformity correction factor.

8. The apparatus of claim 1, wherein the controller is to determine the correction factor by:
identifying a loss function for all color channels based on an intra-pixel variance of color content and a variation of brightness from a target brightness;
identifying a gradient for all color channels; and
applying an optimization technique to the loss function and the gradient.

9. The apparatus of claim 8, wherein the controller is further to:
prioritize at least one of the loss function or the gradient over each other by employing at least one weight factor.

10. The apparatus of claim 1, wherein the consecutive non-linear pattern is a coherent Lissajous pattern.

11. The apparatus of claim 1, wherein the beam scanner is a micro-electromechanical system (MEMS) scanner, and the beam scanner is to paint the FOV larger than a FOV of the image generated by the scanned light beam.

12. A near-eye display device, comprising:
a waveguide to provide an image on an eye box;
a projector optically coupled to the waveguide, the projector comprising:
a multi-ridge light source to provide a light beam, wherein ridges of the light source are aligned horizontally, vertically, or at an angle;

a two-dimensional (2D) beam scanner optically coupled to the multi-ridge light source, the 2D beam scanner to:
receive the light beam; and
generate a light field by performing a biresonant scan of the light beam; and
a controller communicatively coupled to the multi-ridge light source and the beam scanner, the controller to:
cause the beam scanner to scan the light beam about a first axis and a second axis within a field of view (FOV) following a consecutive non-linear pattern;
determine a correction factor for each firing of each emitter of the light source for each frame of an image generated by the scanned light beam; and
utilize the determined correction factor for each firing of each emitter of the light source.

13. The near-eye display device of claim 12, wherein
the correction factor is determined based on at least one of a local painting velocity vector, a brush-width, a skip, a location within the FOV, or time, and
the brush-width corresponds to a number of ridges of the multi-ridge light source multiplied by a vector connecting two adjacent ridges, and the skip corresponds to a vertical displacement for the ridges of the multi-ridge light source.

14. The near-eye display device of claim 12, wherein
the correction factor is a number between 0 and 1, and
correction factors for each emitter are stored in a memory as a correction factor map, or
correction factors for consecutive firing events are stored as a vector.

15. The near-eye display device of claim 12, wherein the controller is to determine the correction factor by:
determining a vertical brightness uniformity correction factor;
determining a horizontal brightness uniformity correction factor; and
multiplying the vertical brightness uniformity correction factor and the horizontal brightness uniformity correction factor.

16. The near-eye display device of claim 12, wherein the controller is to determine the correction factor by:
identifying a loss function for all color channels based on an intra-pixel variance of color content and a variation of brightness from a target brightness;
identifying a gradient for all color channels; and
applying an optimization technique to the loss function and the gradient.

17. A method, comprising:
generating a light beam at a multi-ridge light source of a scanning projector, wherein a distance between ridges of the multi-ridge light source is larger than one pixel and the ridges are aligned horizontally, vertically, or at an angle;
scanning the light beam, at a two-dimensional (2D) beam scanner, about a first axis and a second axis within a field of view (FOV) following a coherent Lissajous pattern in a biresonant manner;
generating a light field on an eye box, by a waveguide, to provide an image to a viewer through the eye box;
determining a correction factor for each firing of each emitter of the light source for each frame of an image generated by the scanned light beam; and
utilizing the determined correction factor for each firing of each emitter of the light source.

18. The method of claim 17, further comprising:
determining the correction factor based on at least one of a local painting velocity vector, a brush-width, a skip, a location within the FOV, or time, wherein the brush-width corresponds to a number of ridges of the multi-ridge light source multiplied by a vector connecting two adjacent ridges, and the skip corresponds to a vertical displacement for the ridges of the multi-ridge light source.

19. The method of claim 17, further comprising:
determining the correction factor by:
identifying a loss function for all color channels based on an intra-pixel variance of color content and a variation of brightness from a target brightness;
identifying a gradient for all color channels; and
applying an optimization technique to the loss function and the gradient.

20. The method of claim 17, further comprising:
storing correction factors for a single emitter in a memory as a correction factor map; or
storing correction factors for consecutive firing events as a vector.

* * * * *